US 8,391,585 B2

Mar. 5, 2013

(12) United States Patent
Kuchii

(54) DEFECT DETECTING DEVICE, DEFECT DETECTING METHOD, IMAGE SENSOR DEVICE, IMAGE SENSOR MODULE, DEFECT DETECTING PROGRAM, AND COMPUTER-READABLE RECORDING MEDIUM

(75) Inventor: Toshimasa Kuchii, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1197 days.

(21) Appl. No.: 11/964,602

(22) Filed: Dec. 26, 2007

(65) Prior Publication Data

US 2008/0205747 A1 Aug. 28, 2008

(30) Foreign Application Priority Data

Dec. 28, 2006 (JP) ................................. 2006-355595
Dec. 6, 2007 (JP) ................................. 2007-316181

(51) Int. Cl.
*G06K 9/00* (2006.01)

(52) U.S. Cl. ........................................................ 382/141

(58) Field of Classification Search .......... 382/141–152; 324/760.01; 348/86–95
See application file for complete search history.

(56) References Cited

U.S. PATENT DOCUMENTS

| 5,717,486 | A | * | 2/1998 | Burri et al. ................. 356/240.1 |
| 6,219,443 | B1 | * | 4/2001 | Lawrence .................... 382/141 |
| 6,683,974 | B1 | | 1/2004 | Nagasawa et al. |
| 6,885,369 | B2 | * | 4/2005 | Tanahashi et al. ............ 345/426 |
| 6,950,545 | B1 | * | 9/2005 | Nomoto et al. ............... 382/141 |
| 7,116,814 | B2 | * | 10/2006 | Jeng et al. .................... 382/141 |
| 7,215,807 | B2 | * | 5/2007 | Nomoto et al. ............... 382/141 |
| 7,783,103 | B2 | * | 8/2010 | Kuchii et al. ................. 382/149 |
| 7,932,917 | B2 | * | 4/2011 | Han et al. ..................... 345/690 |
| 2002/0154811 | A1 | * | 10/2002 | Katsuta et al. ................ 382/151 |
| 2003/0214586 | A1 | * | 11/2003 | Lee et al. ..................... 348/180 |
| 2007/0071304 | A1 | * | 3/2007 | Kuchii et al. ................. 382/141 |
| 2008/0205747 | A1 | * | 8/2008 | Kuchii ......................... 382/149 |

FOREIGN PATENT DOCUMENTS

| JP | 5-272940 | A | 10/1993 |
| JP | 6-174658 | A | 6/1994 |
| JP | 6-300998 | A | 10/1994 |
| JP | 9-119900 | A | 5/1997 |
| JP | 9-292307 | A | 11/1997 |
| JP | 9-318555 | A | 12/1997 |
| JP | 10-048152 | A | 2/1998 |
| JP | 1048152 | | 2/1998 |
| JP | 11-66311 | A | 3/1999 |

(Continued)

*Primary Examiner* — Chan S Park
*Assistant Examiner* — Sean Motsinger
(74) *Attorney, Agent, or Firm* — Birch, Stewart, Kolasch & Birch, LLP

(57) ABSTRACT

A defect detecting device includes a pixel value correcting section, a block-division processing section, and a defective/non-defective determining section. The pixel value correcting section corrects a pixel value of an inspection-target image, on which detection of a defective area is to be carried out, in such a manner that the defective area of the inspection-target image is emphasized with respect to the other areas of the inspection-target image. The block-division processing section divides, into plural blocks, the inspection-target image with pixel values having been corrected, and obtains a block addition value or a block mean value. The defective/non-defective determining section determines whether or not the defective area is present by carrying out statistical processing to determine whether an outlier of the block addition value or an outlier of the block mean value is present or not.

19 Claims, 18 Drawing Sheets

FOREIGN PATENT DOCUMENTS

| | | |
|---|---|---|
| JP | 2001-264257 A | 9/2001 |
| JP | 2003-14437 A | 1/2003 |
| JP | 2003-141509 A | 5/2003 |
| JP | 2003-216928 A | 7/2003 |
| JP | 2004-219382 A | 8/2004 |
| JP | 2004-294202 A | 10/2004 |
| JP | 2005-165387 A | 6/2005 |

* cited by examiner

LINE DEFECT DETECTED PROPERLY

DEFECT DETECTING DEVICE, DEFECT DETECTING METHOD, IMAGE SENSOR DEVICE, IMAGE SENSOR MODULE, DEFECT DETECTING PROGRAM, AND COMPUTER-READABLE RECORDING MEDIUM

This Nonprovisional application claims priority under 35 U.S.C. §119(a) on Patent Applications No. 355595/2006 filed in Japan on Dec. 28, 2006, and No. 316181/2007 filed in Japan on Dec. 6, 2007, the entire contents of which are hereby incorporated by reference.

FIELD OF THE INVENTION

The present invention relates to a defect detecting device, a defect detecting method, an image sensor device, an image sensor module, a defect detecting program, and a computer-readable recording medium, by which defects are detected accurately during inspection carried out in production of image sensor devices.

BACKGROUND OF THE INVENTION

It is very important in quality inspection of digital images to determine whether or not there is a defective area where pixel values do not vary evenly. Especially in recent years, image sensor devices such as digital still cameras and mobiles phones with built-in cameras have been increasingly demanded. This has increased demands for image sensor devices of higher quality. Thus, it has been increasingly demanded to detect defective areas that occur in digital images (image-sensor image) taken by use of the image sensor devices, including spot defects, unevenness defects, line defects and the like, during inspection.

In other words, even if the image sensor devices are non-defective devices, image values do not become constant owning to noise components and components called shading, in which pixels values change gently with respect to pixel coordinates. Especially in image-sensor images, presence of spot defects, unevenness defects, line defects and the like cause the pixels values to change in a complicated manner according to the respective defects with respect to the pixel coordinates. It is therefore not easy to detect the defects. Thus, a method of detecting image quality with high sensitivity has been demanded.

The spot defect indicates a state in which plural pixel values of an area each differ from the surrounding pixel values by a difference smaller than that in the point defect. The point defect indicates a state in which a single pixel value of the image-sensor image differs significantly from respective image values of the surrounding eight pixels and is thus an outstanding value (or a depressed value). The unevenness defect indicates a state in which plural pixels having pixel values that differ from one another by a smaller difference than that in the pixels of the spot defects. The line defect indicates a state in which pixel values in a row direction of the image-sensor image, pixel values in a column direction of the image-sensor image, or pixel values in a slanting direction at an arbitrary angle are significantly different from the surrounding pixel values and are thus outstanding values (or depressed values).

The shading indicates a state in which the pixel value changes gently with respect to the pixel coordinate and decreases toward an upper end, a lower end, a rightward end, and a leftward end of the image-sensor image. The shading occurs owning to reduction in sensitivity of a pixel at an edge of the image with respect to a pixel at the center of the image.

Conventionally, spot defects, unevenness defects, line defects and the like on flat panel displays, such as image-sensor images and liquid crystal panels, have been visually inspected by inspecting staff. This way of inspection depends on subjective judgment of the inspecting staff and therefore has a problem that the results of this inspection are not consistent because standards of the inspection vary among the inspecting staff or because of physical condition of the inspecting staff at the time of the inspection. There is another problem that it is difficult with this way of inspection to quantify the defects. Thus, inspecting devices that quantify the defects and detect the defects during production of the image sensor devices have been developed in recent years, and automation with the inspecting devices has also been carried out. The inspecting device detects the defects generally by actually taking an image and carrying out image processing on the image thus taken.

For example "Japanese Unexamined Patent Publication No. 2004-294202 (published on Oct. 21, 2004)" (hereinafter, "Publication 1") discloses the defect detecting method described below. In this method, first of all, reduced images of image values of images (detected image) taken by an image pickup device are created in several sizes according to the types of the defects, and filtering is carried out on the image values to emphasize the defects. Then, statistical processing of information on luminance in the detected image is carried out on bright defects and on dark defects separately. Thereafter, a threshold value for detecting potential defects is determined on the basis of the statistical data. Then, potential defects are detected. Thereafter, evaluation values of the potential defects thus detected are obtained quantitatively. The foregoing makes it possible to determine, according to the kinds of defects, whether or not the image detected contains a potential defect.

Concretely, in spot-defect detection carried out in the defect detecting method, a process with application of a smoothing filter or a morphological operation (smoothing process) is first carried out. Then, an image obtained as a result of the smoothing process is reduced to various sizes to create reduced images. Thereafter, contrast of the spot defects in the reduced images are emphasized with the use of a top-hat filter that is a spatial filter. At this time, offset processing is also carried out to allow the process of emphasizing dark points to be carried out. Then, statistical computation is carried out on the basis of the luminance values of respective pixels of the detected image, and the threshold value is determined by use of statistical data obtained as a result of the statistical computation. On the basis of the threshold value thus determined for luminance, it is determined whether or not the detected image contains a potential defect.

In Publication 1, the smoothing process is always carried out during detection of spot defects, streak defects, unevenness defects, and line defects, in order to eliminate noise components. However, with the smoothing process only, the impact of the noise components is still high. Thus, in the defect detecting method of Publication 1, there is a possibility of erroneous determination as to whether a potential defect is present or not.

For example in the case in which the statistical processing of Publication 1 is carried out on the image having undergone edge detection as shown in FIG. 24, a defective area A (see FIG. 24), which is desired to be detected, is buried in the noise components as shown in FIG. 25. Thus, with the defect detecting method of Publication 1, there is a possibility of erroneous determination indicating that there is no potential defect is made even though there is a defect that is supposed to be determined as a potential defect.

Further, Publication 1 uses, as an image that is to be detected, a luminance image of the combination of RGB. Thus, with the defect detecting method of Publication 1, there is a possibility of erroneous determination as to whether a potential defect is present or not, in the case of image sensor devices in which defects occur by the combination of RG or GB.

For example, the image shown in FIG. 26 is an image obtained as a result of below-described edge detection carried out on the luminance image. FIG. 27 shows that carrying out the statistical processing on the image having undergone the edge detection lowers sensitivity in detection of line defects that are desired to be detect, and therefore the defect that is not supposed to be detected as the line defect is emphasized. Thus, this case also has a possibility that a line defect that is supposed to be detected is not detectable by the defect detecting method of Publication 1.

SUMMARY OF THE INVENTION

The present invention is in view of the foregoing problems, and has as an object to provide a defect detecting device, a defect detecting method, an image sensor device, and an image sensor module, by which defective areas of image-sensor images are emphasized to allow the defective areas to be detected accurately.

To solve the above problems, a defect detecting device of the present invention that detects, from a digital image, a defective area where a pixel value changes more unevenly than a pixel value in an area surrounding the defective area does, includes: a pixel value correcting section that corrects a pixel value of an inspection-target image, on which detection of the defective area is to be carried out, in such a manner that a pixel value corresponding to an area that is to be detected as the defective area is emphasized with respect to a pixel value of an area other than the defective area; and a block-division processing section that divides the inspection-target image into plural blocks and obtains a block addition value, which is a value obtained by adding pixel values of pixels present in a block, or a block mean value, which is a value obtained by dividing the block addition value by the number of pixels in the block. The block addition value or the block mean value is supplied to a defective-area presence determining section that determines whether the defective area is present or not, by carrying out statistical processing to determine whether an outlier of the block addition value or an outlier of the block mean value is present or not.

With this configuration, if a defective area is present in the inspection-target image, the pixel value correcting section corrects the pixel value of the defective area so as to emphasize the pixel value. In the block-division processing section, the inspection-target image is divided into plural blocks, and the block addition value or the block mean value is obtained. In other words, the inspection-target image undergoes the processing in the pixel value correcting section and the processing in the block-division processing section in the defect detecting device. The block addition value or the block mean value thus obtained in the block-division processing section is supplied to the defective-area presence determining section. Then, statistical processing based on the block addition value or the block mean value is carried out in the defective-area presence determining section to determine whether the defective area is present or not in the inspection-target image.

The foregoing reliably differentiates between the defective areas and the noise components in the inspection-target image. This enables accurate detection of defective areas. Furthermore, it also becomes possible to reduce erroneous determination as to whether a defective area is present or not.

Note that the timing at when the block-division processing section obtains the block addition value or the block mean value, both of which are to be supplied to the defective-area presence determining section, may be either before or after the processing in the pixel value correcting section. That is to say, the block-division processing section may obtain the block addition value or the block mean value of respective blocks of the inspection-target image either before or after the pixel value correcting section corrects the pixel value of the inspection-target image.

To solve the above problems, a defect detecting device of the present invention that detects, from a digital image, a defective area where a pixel value changes more unevenly than a pixel value of an area surrounding the defective area does, includes: a block-division processing section that divides an inspection-target image, on which detection of the defective area is to be carried out, in a block shape predetermined according to a shape of the defective area, and obtains a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With this configuration, the block-division processing section divides the image in a block shape predetermined according to the shape of the defective area, and the block addition value or the block mean value of each block is obtained. The block addition value or the block mean value is supplied to the defective-area presence determining section, and the statistical processing based on the block addition value or the block mean value is carried out in the defective-area presence determining section to determine whether a defective area is present or not in the inspection-target image.

The foregoing allows the block-division processing section to inspect the defective areas by use of the block shapes corresponding to the defective areas, respectively. This enables accurate detection specialized in the respective defective areas. Further, the defective-area presence determining section carries out the processing by use of the block addition value or the block mean value of the inspection-target image thus processed in the block-division processing section. This makes it possible to reduce erroneous determinations as to whether a defective area is present or not.

To solve the above problems, a defect detecting device of the present invention that detects, from a digital image, a defective area where a pixel value changes more unevenly than a pixel value of an area surrounding the defective area does, includes: an image creating section that creates a color-difference image based on an inspection-target image, on which detection of the defective area is to be carried out; and a block-division processing section that divides the color-difference image, which is created in the image creating section, into plural blocks, and obtains a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With this configuration, the color-difference image is created in the image creating section as the inspection-target image. In the block-division processing section, the color-difference image is divided into the plural blocks, and obtains the block addition value or the block mean value of each block. Then, the block addition value or the block mean value is supplied to the defective-area presence determining section, and the statistical processing based on the block addition value or on the block mean value is carried out in the defective-area presence determining section, whereby it is determined whether the defective area is present or not in the inspection-target image.

The foregoing makes it possible to detect the defects due to color change in the inspection-target image. Further, if the defects due to color change are present in either the vertical direction or the horizontal direction of the inspection-target image, the vertical line defects or the horizontal line defects are accurately detectable. Further, the processing in the defective-area presence determining section is carried out by use of the block addition value or the block mean value of the color-difference image having undergone the processing in the block-division processing section. This makes it possible to reduce erroneous determinations as to whether the defective area is present or not.

To solve the above problems, a defect detecting method, according to the present invention, of detecting, from a digital image, a defective area where a pixel value changes more unevenly than a pixel value of an area surrounding the defective area does, includes: correcting a pixel value of an inspection-target image, on which detection of the defective area is to be carried out, in such a manner that a pixel value corresponding to an area that is to be detected as the defective area is emphasized with respect to a pixel value of an area other than the defective area; and dividing the inspection-target image into plural blocks and obtaining a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With the foregoing defect detecting methods, the same processes as those carried out in the defect detecting device of the present invention are realized in the respective steps. Thus, the same effects as those produced by the defect detecting device of the present invention are obtainable.

To solve the above problems, a defect detecting method, according to the present invention, of detecting, from a digital image, a defective area where a pixel value changes more unevenly than a pixel value of an area surrounding the defective area does, includes: creating a color-difference image based on an inspection-target image, on which detection of the defective area is to be carried out; and dividing the color-difference image, which is created in the step of creating a color-difference image, into plural blocks and obtaining a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With the foregoing defect detecting methods, the same processes as those carried out in the defect detecting device of the present invention are realized in the respective steps. Thus, the same effects as those produced by the defect detecting device of the present invention are obtainable.

Additional objects, features, and strengths of the present invention will be made clear by the description below. Further, the advantages of the present invention will be evident from the following explanation in reference to the drawings.

DESCRIPTION OF THE EMBODIMENTS

1. Basic Device Configurations

The following describes an embodiment of the present invention, with reference to FIGS. 1 to 27.

Figure 1:
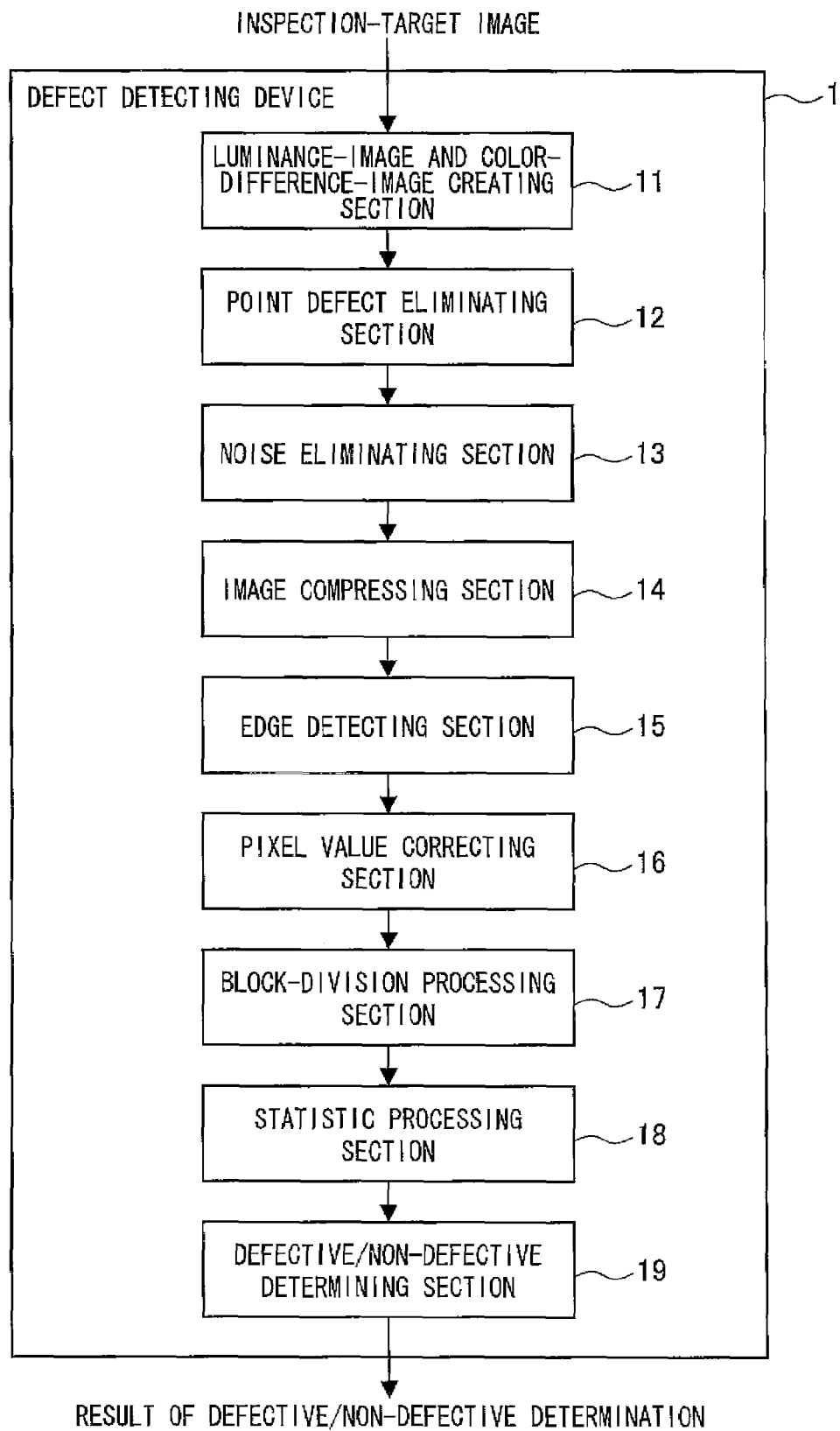
FIG. 1 is a block diagram showing a schematic configuration of a detect detecting device in accordance with an embodiment of the present invention.

FIG. 1 is a block diagram showing a schematic configuration of a defect detecting device 1 of the present embodiment. The defect detecting device 1 includes a luminance-image and color-difference-image creating section (image creating section) 11, a point defect eliminating section 12, a noise eliminating section 13, an image compressing section 14, an edge detecting section 15, a pixel value correcting section 16, a block-division processing section 17, a statistic processing section 18 (defective-area presence determining section), and a defective/non-defective determining section 19 (defective-area presence determining section).

Figure 2:
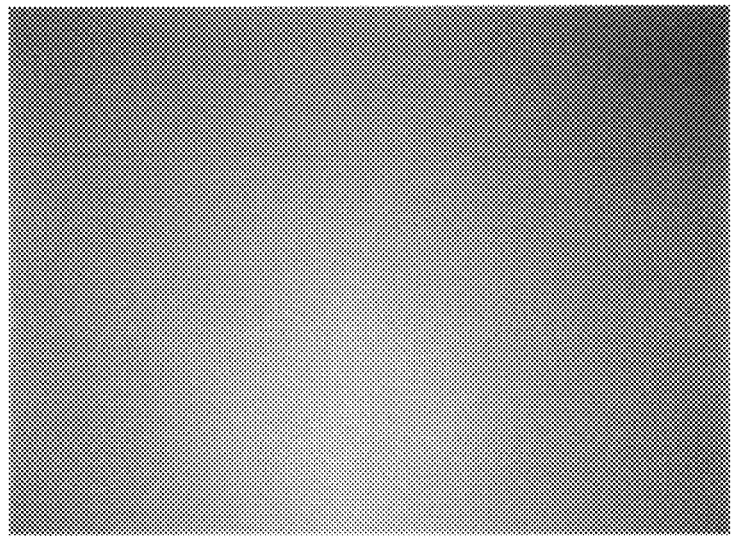
FIG. 2 is a figure showing an original color image of an inspection-target image used in the defect detecting device shown in FIG. 1.
Figure 4:
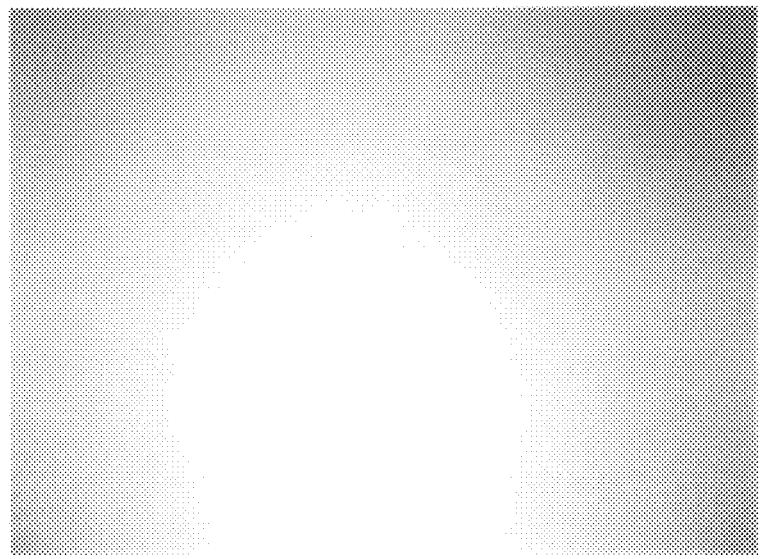
FIG. 4 is a figure showing a luminance image created on the basis of the original color image of the inspection-target image shown in FIG. 2.
Figure 5:
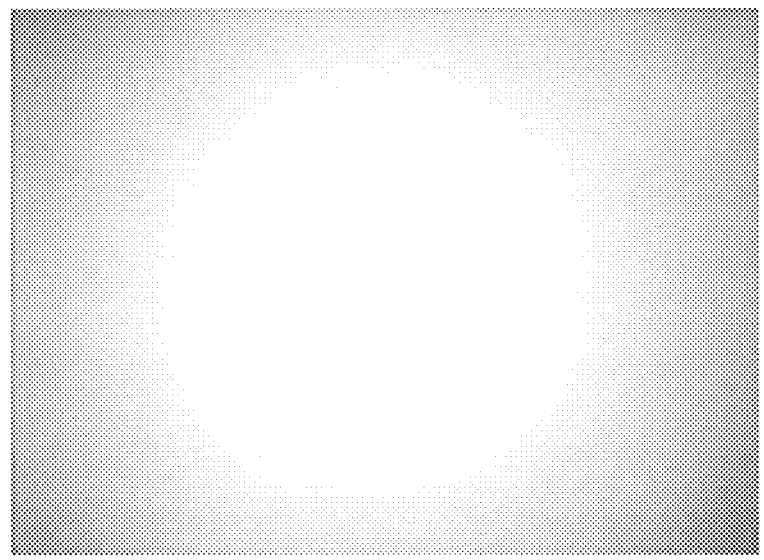
FIG. 5 is a figure showing a luminance image created on the basis of the original color image of the inspection-target image shown in FIG. 3.

The luminance-image and color-difference-image creating section 11 imports an image-data image (inspection-target image), which is a target of inspection, taken by an image pickup device (not illustrated), such as a CCD (charge coupled devices) sensor provided to the image sensor device, and creates a luminance image or a color-difference image on the basis of the inspection-target image. The luminance image is obtained as a result of converting the pixel value of the original color image of the inspection-target image expressed by RGB (R: red, G: green, B: blue) as shown in FIG. 2 or in FIG. 3 into a luminance signal Y as shown in FIG. 4 or in FIG. 5 by $Y=0.299 \times R+0.587 \times G+0.114 \times B.$ The luminance image shown in FIG. 4 is created on the basis of the original color image of the inspection-target image as shown in FIG. 2. The luminance image shown in FIG. 5 is created on the basis of the original color image of the inspection-target image as shown in FIG. 3.

Figure 3:
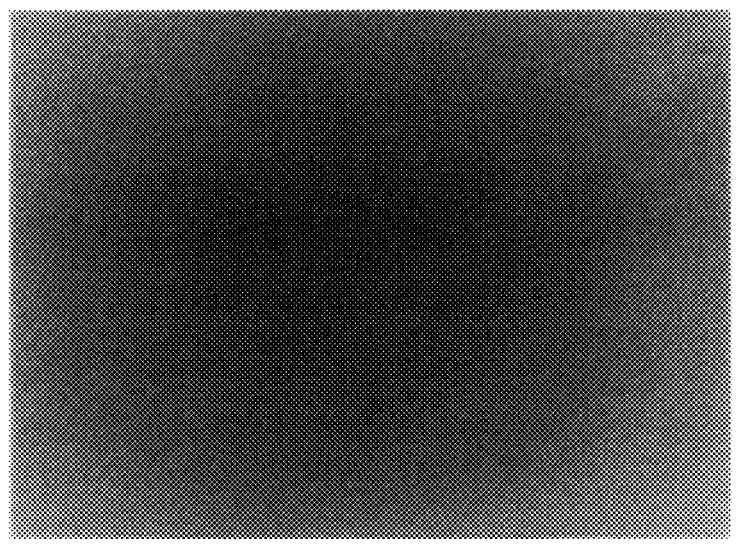
FIG. 3 is a figure showing another original color image of the inspection-target image used in the defect detecting device shown in FIG. 1.
Figure 6:
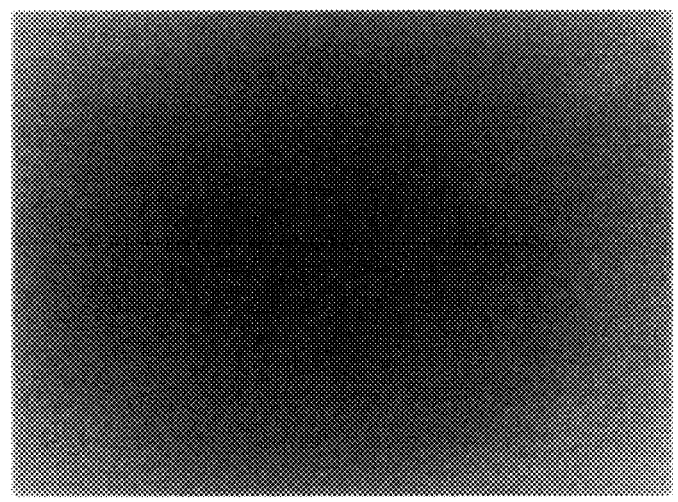
FIG. 6 is a figure showing a color-difference image created on the basis of the original color image of the inspection-target image shown in FIG. 3.

The color-difference image is obtained as a result of converting the pixel value of the original color image of the inspection-target image expressed by RGB as shown in FIG. 3 into color-difference signals U and V as shown in FIG. 6 by $$U = B - Y$$
$$= -0.299 \times R - 0.587 \times G + 0.886 \times B + \text{offset}$$

and $$V = R - Y$$
$$= 0.701 \times R - 0.587 \times G - 0.114 \times B + \text{offset}.$$

Note that Y denotes the luminance signal mentioned above, and offset denotes a value of a halftone. For example, offset=128 in the case of 8 bits, and offset=512 in the case of 10 bits. The color-difference image shown in FIG. 6 is created by applying U=B−Y to the original color image of the inspection-target image shown in FIG. 3. This, however, is not a limited case, and the color-difference image may be created by V=R−Y.

The point defect eliminating section 12 carries out elimination of point defects from the inspection-target image by use of a point defect eliminating filter, for example. The point defect eliminating filter is a filter that obtains a median value, the largest value, and the smallest value of the pixel values of nine pixels in a three-by-three area having the target pixel at the center of the area, for example. If the pixel value of the target pixel is the largest value (smallest value) and has a significant difference from the surrounding eight pixels, then the filter replaces the pixel value of the target pixel by the median value. The point defect filter is not limited to the foregoing filters, and may be a filter that replaces the pixel value of the target pixel by either the mean value of the nine pixels or the mean value of the eight pixels surrounding the target pixel.

The noise eliminating section 13 carries out elimination of noise from the inspection-target image by use of a smoothing filter, for example. The smoothing filter is a filter by which high frequency components of the image are cut to eliminate noise. For example, a filter that obtains the mean value of the nine pixel values of the three-by-three area having the target pixel at the center of the area and determines the mean value as the pixel value of the target pixel corresponds to the smoothing filter.

The image compressing section 14 carries out reduction of the inspection-target image in horizontal and vertical sizes to compress the inspection-target image. This makes it possible to reduce the amount of data of the inspection-target image and to eliminate noise components that the noise eliminating section 13 fails to eliminate.

The edge detecting section 15 carries out manifestation of edges of spot defects, unevenness defects, and line defects, by use of a Laplacian filter, for example. The Laplacian filter is a filter for extracting edges of changes between dark and light on the image. This is a filter that subtracts the pixel values of an upper pixel, a lower pixel, a leftward pixel, and a rightward pixel (four neighboring pixels) from a value obtained by multiplying the pixel value of the target pixel by four, and determines a value thus obtained as the pixel value of the target pixel, for example.

The pixel value correcting section 16 corrects the pixel value by use of a filter. This makes it possible to further eliminate noise and to emphasize the defective areas of the inspection-target image. The processing that is to be carried out in the pixel value correcting section 16 will be specifically described later.

The block-division processing section 17 divides the inspection-target image in the shape of a mesh so that plural blocks are formed. Further, the block-division processing section 17 obtains the block addition value, which is a value obtained by adding all pixel values of each block, of the inspection-target image thus divided into the plural blocks. Although the block addition value is obtained in the present case, this is not a limited case. It is good enough to obtain a value that can represent the block such as a mean value of all pixel values of a block, a mode (mode value) of all pixel values of the block, and a standard deviation. If the blocks divided differ in area, a possible alternative is to obtain the block mean value, which is the mean value of all pixel values of a block, in place of the block addition value. The processing that is to be carried out in the block-division processing section 17 will be specifically described later.

To detect a block having a spot defect, an unevenness defect, and/or a line defect, the statistic processing section 18 carries out statistical processing on the block addition value or the block mean value, both of which are obtained by the block-division processing section 17. If the block has irregularities such as spot defects, unevenness defects, and line defects, the block addition value of the block having the defects or the block mean value of the block having the defects exhibits a statistical outlier. Thus, the statistic processing section 18 obtains, concretely, the largest value, the mean value, and the standard deviation of the block addition values obtained for the respective plural blocks, or obtains the largest value, the mean value, and the standard deviation of the block mean values obtained for the respective plural blocks.

The defective/non-defective determining section 19 carries out outlier determination on the largest value among the block addition values to determine whether the block addition value or the block mean value is an outlier or not, thereby determining whether the inspection-target image itself is defective or not. The outlier determination is carried out in accordance with $$\text{evaluation value(largest)} = (\text{largest value} - \text{mean value}) / \text{standard deviation} \geq \text{determination threshold value}.$$

The largest value, the mean value, and the standard deviation are obtained by the statistic processing section 18.

Further, the defective/non-defective determining section 19 determines whether or not the respective plural blocks thus divided by the block-division processing section 17 contain spot defects, unevenness defects, and/or line defect. This determination is carried out in accordance with $$\text{evaluation value} = (\text{block addition value of each block} - \text{the mean value}) / \text{standard deviation} \geq \text{determination threshold value}.$$

The mean value and the standard deviation in the formula above are obtained by the statistic processing section 18. The way to determine the determination threshold value of the defective/non-defective determining section 19 will be described later.

Further, the defect detecting device 1 is equipped with a memory (not illustrated). In the memory, filters that are necessary for various processing, parameters, and results of computations are stored. For example, the smoothing filter used in the noise eliminating section 13, the filter used in the pixel value correcting section 16, the block addition values or the block mean values that are obtained in the block-division processing section 17, the mean value and the like of the block addition values that is obtained in the statistic processing section 18, and the defective/non-defective determination results supplied from the defective/non-defective determining section 19 are stored in the memory.

2. Process Carried Out in the Defective/Non-Defective Determining Section

The following describes how the determination threshold value determined in the defective/non-defective determining section 19 is obtained. Although the following discusses the case using the block addition value, it is also possible to use the block mean value in place of the block addition value.

Figure 7:
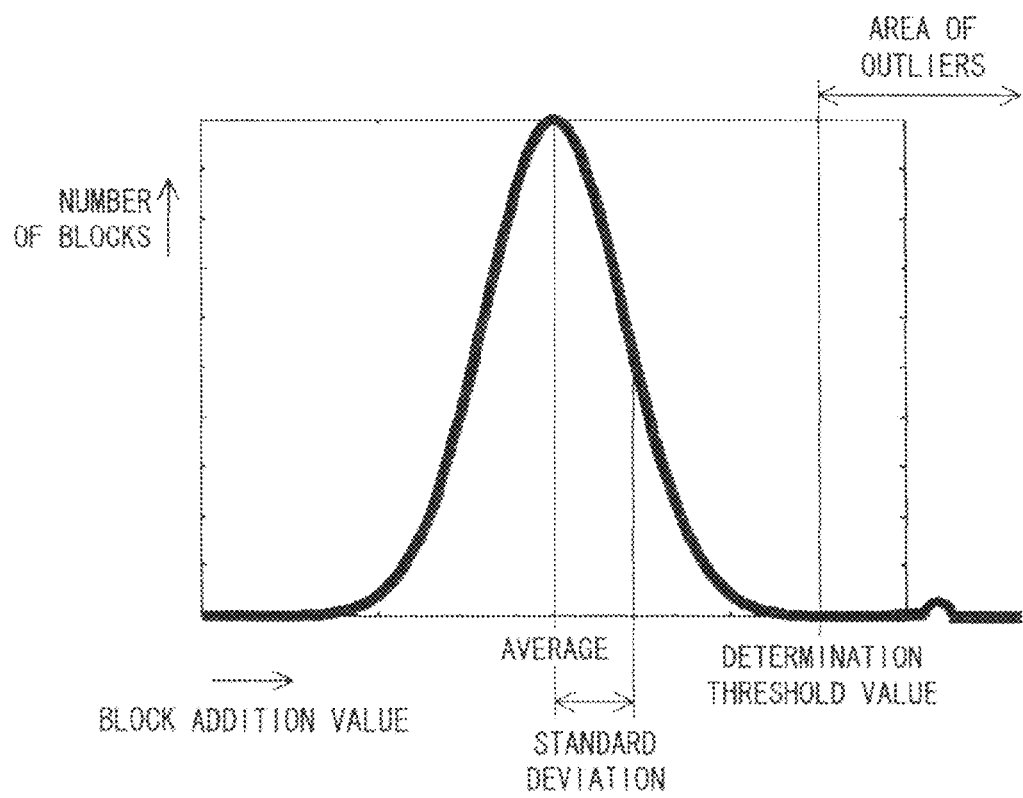
FIG. 7 is a figure showing an exemplary histogram that shows a distribution of block addition values obtained by the block-division processing section of the defect detecting device shown in FIG. 1.

FIG. 7 is an exemplary histogram showing a distribution of the block addition values. In FIG. 7, the horizontal axis is the block addition value, and the vertical axis is the number of blocks. If the inspection-target image is an image obtained with a non-defective image sensor device, the noise components that all of the point defect eliminating section 12, the noise eliminating section 13, and the image compressing section 14 fail to eliminate become dominant. In this case, the distribution of the block addition values or the block mean values exhibits a shape similar to a normal distribution. Accordingly, the determination threshold value is obtained by use of the mean value and the standard deviation of the block addition values of the image obtained with the non-defective image sensor.

It is possible to determine the determination threshold value as follows. One or plural non-defective images that serve as standard are prepared, and the block addition value or the block mean value is obtained for each non-defective image. Then, the determination threshold value is obtained in accordance with $$\text{determination threshold value} = (\text{the largest value among the block addition values} - \text{the mean value of the block addition value}) / \text{the standard deviation of the block addition values}.$$

Although the determination threshold value is obtained by use of the mean value of the block addition value obtained in the statistic processing section 18 (see FIG. 1), this is not a limited case. It is also possible to use a mode (mode value) of the block addition value or a median (intermediate value) of the block addition value in place of the mean value of the block addition value.

Further, although the determination threshold value is obtained in accordance with the formula above, this is not a limited case. It is also possible to determine the determination threshold value on the basis of the number n of data and a critical region a (=0.01, for example) by the Smirnov-Grubbs' outlier test. The Smirnov-Grubbs' outlier test is a method of testing statistical outliers of sample data obtained from the same statistical population. With this method, the significance level (this is also called a critical region, and, generally, values of 0.01 and 0.05 are often used) and the number of sample data are determined, whereby it becomes possible to uniquely determine the threshold value for determining whether inspection-target data is an outlier or not.

Note that the value (evaluation value) used in the defective/non-defective determination is a value normalized with the standard deviation. Thus, the determination threshold value is not an absolute value but a value determined as a scaling factor with respect to the standard deviation. Setting the determination threshold value in this way makes it possible to carry out the defective/non-defective determination without being affected by variations in the pixel values among the inspection-target images.

Figure 8:
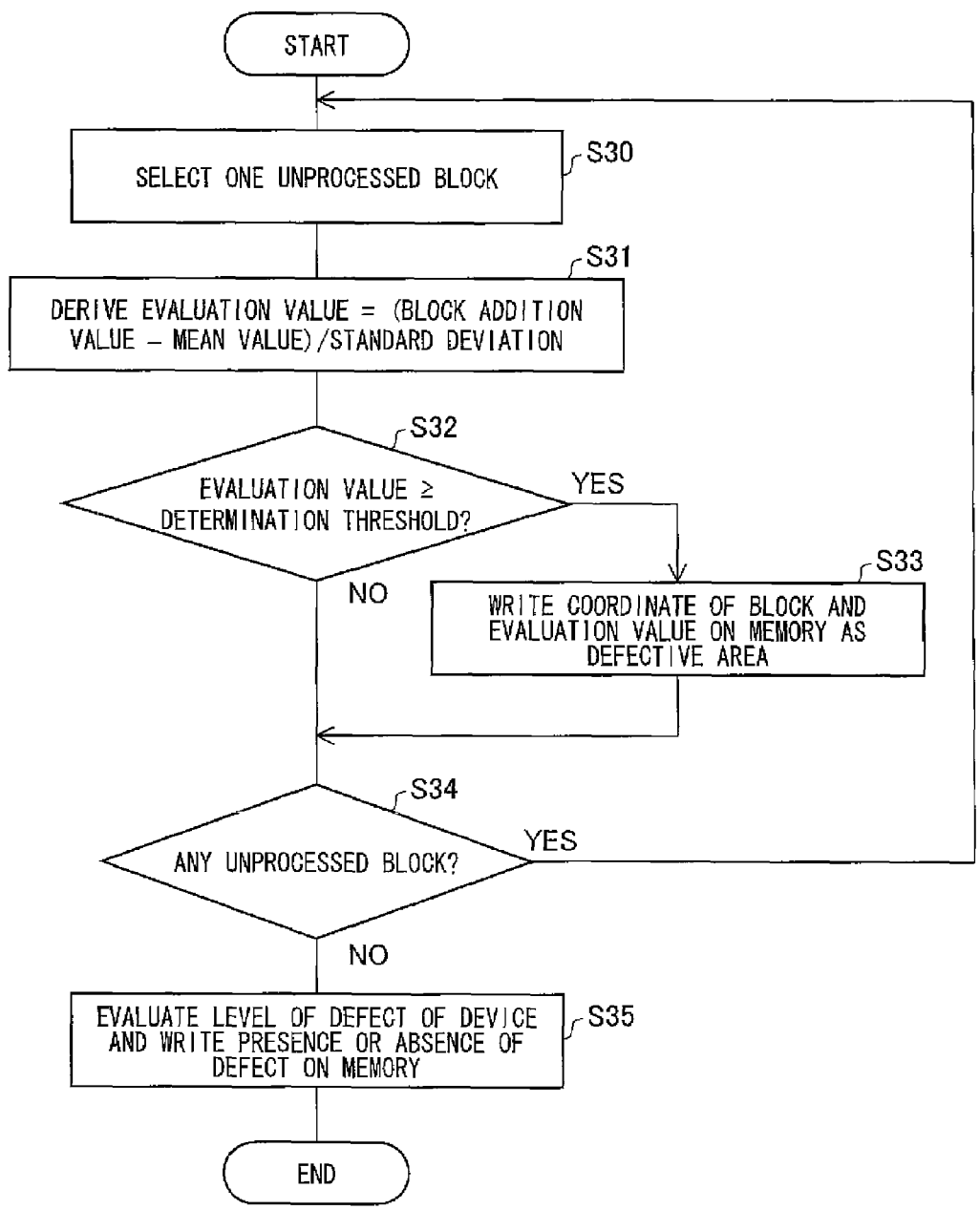
FIG. 8 is a flowchart for the case in which a defective/non-defective determining section of the defect detecting device shown in FIG. 1 carries out a defective/non-defective determination on each block created on the basis of the inspection-target image.
Figure 9:
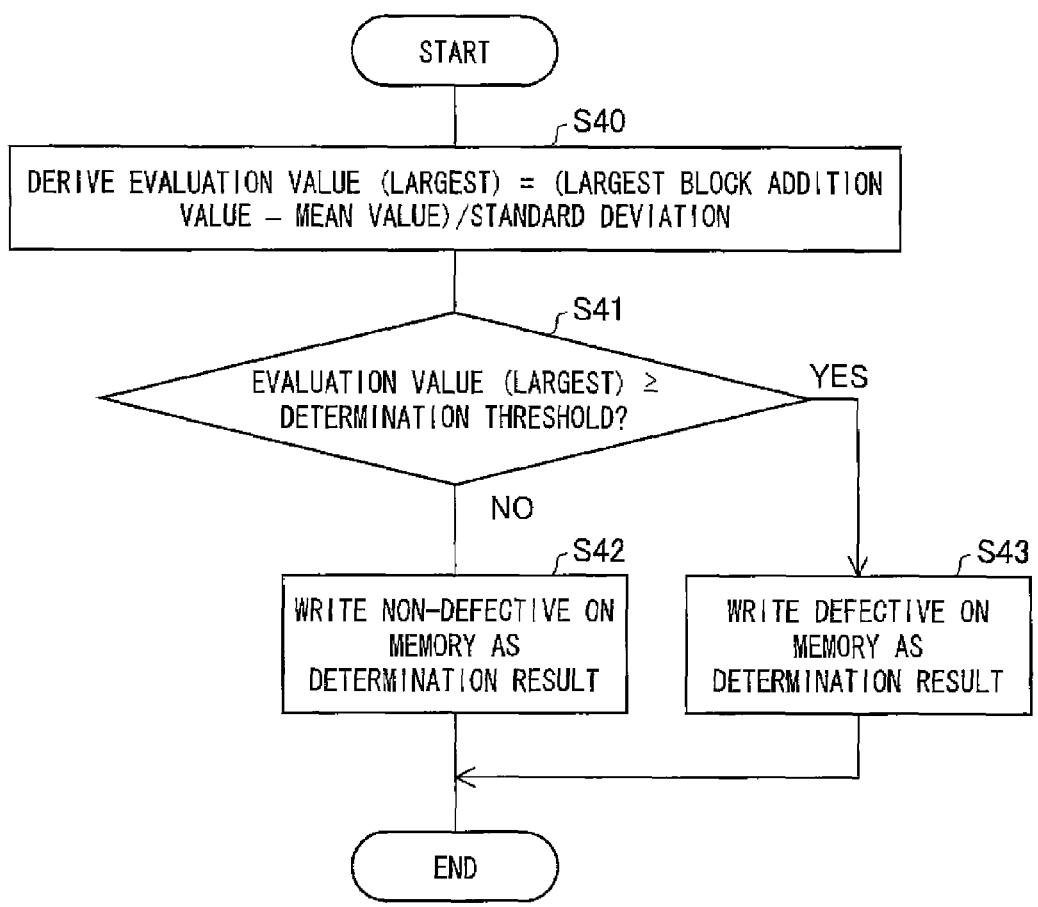
FIG. 9 is a flowchart for the case in which the defective/non-defective determining section of the defect detecting device shown in FIG. 1 carries out the defective/non-defective determination on the basis of the largest value among the block addition values obtained by the statistic processing section.

The following describes the processing carried out by the defective/non-defective determining section 19. FIG. 8 shows the flow of the case in which the defective/non-defective determination is carried out on the respective blocks created on the basis of the inspection-target image.

First, the defective/non-defective determining section 19 selects one block from the inspection-target image, which block has not undergone the defective/non-defective determination, yet (S30), and obtains the evaluation value of the block thus selected (S31). The evaluation value is obtained in accordance with $$\text{the evaluation value} = (\text{the block addition value in the block selected} - \text{the mean value})/\text{the standard deviation}.$$

Then, the defective/non-defective determining section 19 compares the evaluation value with the determination threshold value (S32). If the evaluation value is not smaller than the determination threshold value, then the defective/non-defective determining section 19 determines that the inspection-target image is defective, and writes the coordinate and the evaluation value of the block on the memory (S33).

On the other hand, if the evaluation value is smaller than the determination threshold value, then the defective/non-defective determining section 19 determines that the inspection-target image is non-defective. Then, the defective/non-defective determining section 19 determines whether or not there is still a block (unprocessed block) that has not undergone the defective/non-defective determination, yet (S34). If there is an unprocessed block, then it returns to S30.

If it is determined in S34 that there is no unprocessed block, the defective/non-defective determining section 19 writes, on the memory, that either a defect is present in the inspection-target image or no defect is present in the inspection-target image (S35). In S35, it is possible to carry out the defective/non-defective determination on the image by determining whether or not anything is written on the memory in S33. It is also possible in S35 to further evaluate the evaluation value written in S33 to obtain a quality rank of the inspection-target image, and then write it on the memory.

The following concretely describes the process of obtaining the quality rank of the inspection-target image. In order to obtain the quality rank, plural ranks are settable according to the level of difference between the evaluation value and the determination threshold value. For example, three reference levels of "large", "medium", and "small" are set with regard to the level of difference between the evaluation value and the determination threshold value, and the three reference levels of "defect-level high", "defect-level middle", and "defect-level low" are set with regard to the quality rank of the inspection-target image. Alternatively, it is possible to set plural determination threshold values to evaluate the quality rank of the inspection-target image.

Further, the processing in the defective/non-defective determining section 19 may be either the processing that is to be carried out on the respective blocks created on the basis of the inspection-target image, or the processing that is to be carried out on the basis of the largest value among the block addition values. The following describes the processing flow of this case, with reference to FIG. 9.

First, the defective/non-defective determining section 19 obtains the evaluation value (largest) in accordance with $$\text{evaluation value(largest)} = (\text{the largest value of the block addition value} - \text{the mean value of the block addition value})/\text{standard deviation}$$

(S40).

Then, the defective/non-defective determining section 19 compares the evaluation value (largest) obtained in S40 with the determination threshold value to determine which one is larger (S41), and writes a result of this determination on the memory either in S42 or in S43.

3. Outline of Processing Flow

Figure 10:
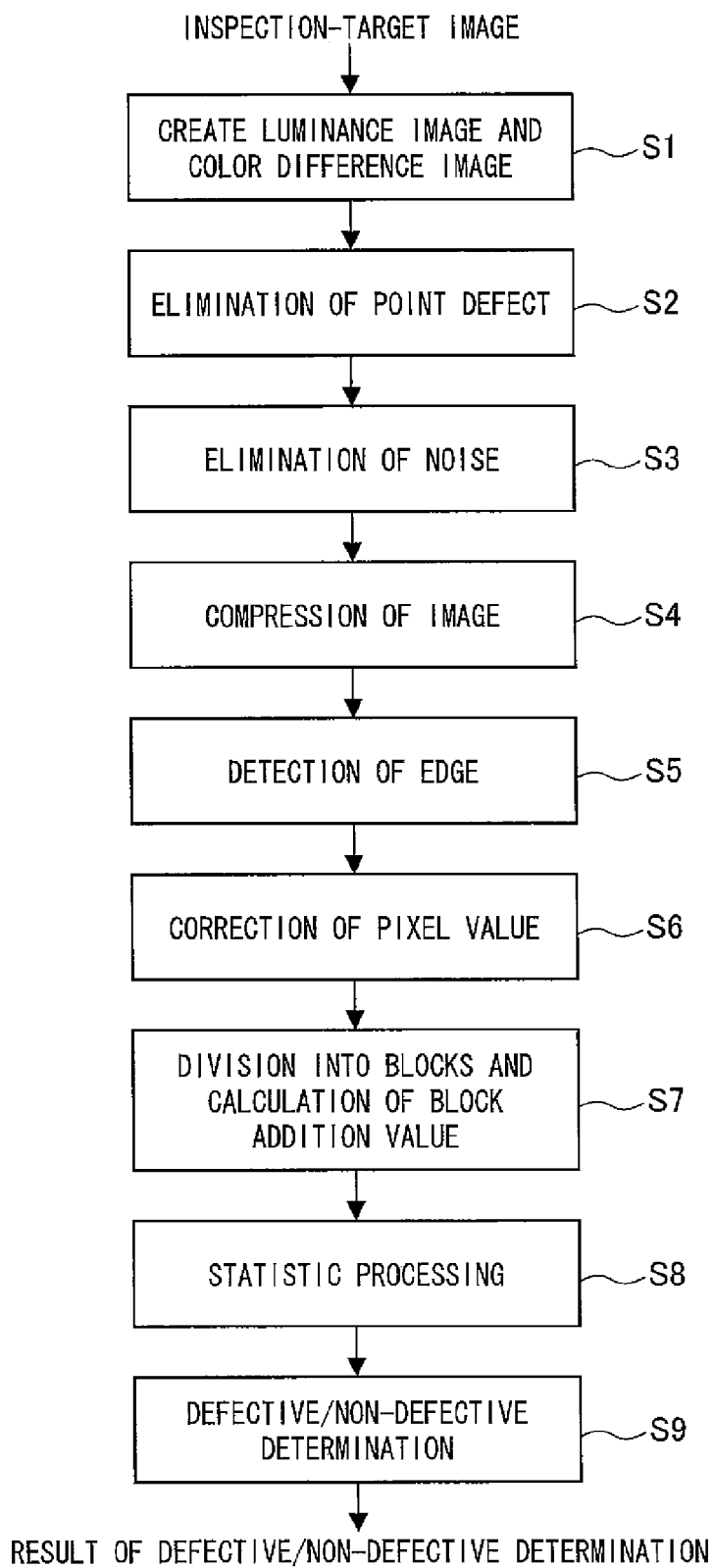
FIG. 10 is a flowchart showing the processing flow of the defect detecting device shown in FIG. 1.

FIG. 10 is a flowchart showing the processing flow of the case in which the defect detecting device 1 carries out the detection of defects on the inspection-target image.

The luminance-image and color-difference-image creating section 11 imports the inspection-target image to create the luminance image or the color-difference image (S1). In the point defect eliminating section 12, the point defects are eliminated from the luminance image or the color-difference image, both of which are created by the luminance-image and color-difference-image creating section 11, by use of the point defect eliminating filter, for example (S2). In the noise eliminating section 13, the noise components are eliminated by use of the smoothing filter, for example (S3). Then, to reduce the amount of data of the inspection-target image and to further eliminate the noise components, the inspection-target image is compressed by the image compressing section 14 (S4). Thereafter, the edge detecting section 15 manifests the edges of the spot defects, the unevenness defects, and the line defects of the inspection-target image thus compressed (S5).

The pixel value correcting section 16 corrects the pixel values of the inspection-target image containing the defects with edges having been manifested, whereby the various defects are emphasized (S6). Thereafter, the block-division processing section 17 divides the inspection-target image having the defects thus emphasized into blocks, and obtains the block addition value or the block mean value of each block (S7). Then, using the block addition value or the block mean value, the statistic processing section 18 carries out the statistical processing. In other words, the largest value, the mean value, and the standard deviation of the block addition values or those of the block mean values are obtained (S8). The evaluation value obtained on the basis of the foregoing values is compared with the determination threshold value to determine whether the inspection-target image is defective or not, or whether each block contains a defect (S9).

With the foregoing configuration, the defect detecting device 1 of the present embodiment includes the pixel value correcting section 16 so that the defective areas and the noise components of the inspection-target image are reliably differentiated. This enables accurate detection of the defective areas. Further, it also becomes possible to reduce erroneous determinations as to whether the defective area is present or not.

The defect detecting device 1 includes the block-division processing section 17 to determine the block shapes according to the type of the defective area such as spot defects, unevenness defects, and line defect. This makes it possible to carry out accurate detection specialized in the defective areas. In addition, the block-division processing section 17 carries out the inspection by use of the block shapes that are prepared in advance and correspond to the spot defects, the line defects, and the obliquely-run defects, respectively. This enables accurate detection specialized in the respective defective areas even if the processing in the pixel value correcting section 16 is not carried out.

Further, the defect detecting device 1 includes the luminance-image and color-difference-image creating section 11. Creating the color-difference image makes it possible to detect defects due to color changes in the inspection-target image. If the defects due to color changes are present in a vertical line or in a horizontal line in the inspection-target image, the vertical line defects or the horizontal line defects are accurately detectable.

In S6 and S7 of the processing flow of the defect detecting device 1 as shown in FIG. 10, the processing in the block-division processing section 17 is carried out following the processing in the pixel value correcting section 16. The order of carrying out those processing, however, is not limited to the foregoing order. The processing in the pixel value correcting section 16 may be carried out following the processing in the block-division processing section 17.

Concretely, the block-division processing section 17 divides, into blocks, the inspection-target image having undergone edge detection carried out in S5 of FIG. 10 by the edge detecting section 15, and obtains the block addition value or the block mean value of each block. Then, the pixel value correcting section 16 corrects the pixel values of the inspection-target image having undergone the processing in the block-division processing section 17. In other words, the pixel value correcting section 16 carries out this correction on the block addition value or the block mean value thus obtained in the block-division processing section 17.

Further, it is also possible that the block-division processing section 17 only carries out block division on the inspection-target image having undergone the edge detection in the edge detecting section 15, and thereafter the processing in the pixel value correcting section 16 is carried out. In this case, the inspection-target image having undergone the block-division in the block-division processing section 17 and the pixel-value correction in the pixel value correcting section 16 is sent back to the block-division processing section 17 after the processing in the pixel value correcting section 16. Then, the process of obtaining the block addition value or the block mean value of each block of the inspection-target image is carried out in the block-division processing section 17.

Note that S3 to S5, which are to be carried out by the noise eliminating section 13, the image compressing section 14, and the edge detecting section 15, in FIG. 10 are not limited to the foregoing order and may be carried out in any order.

Further, although the defect detecting device 1 of the present embodiment is equipped with the statistic processing section 18 and the defective/non-defective determining section 19, this is not a limited configuration. It is also provide the statistic processing section 18 and the defective/non-defective determining section 19 to an external device such as a tester.

The following describes in detail the processing in the pixel value correcting section 16 and the processing in the block-division processing section 17. The following also describes in detail how the defects are detected with the use of the color-difference image.

4. Process Carried Out in the Pixel Value Correcting Section

Figure 11:
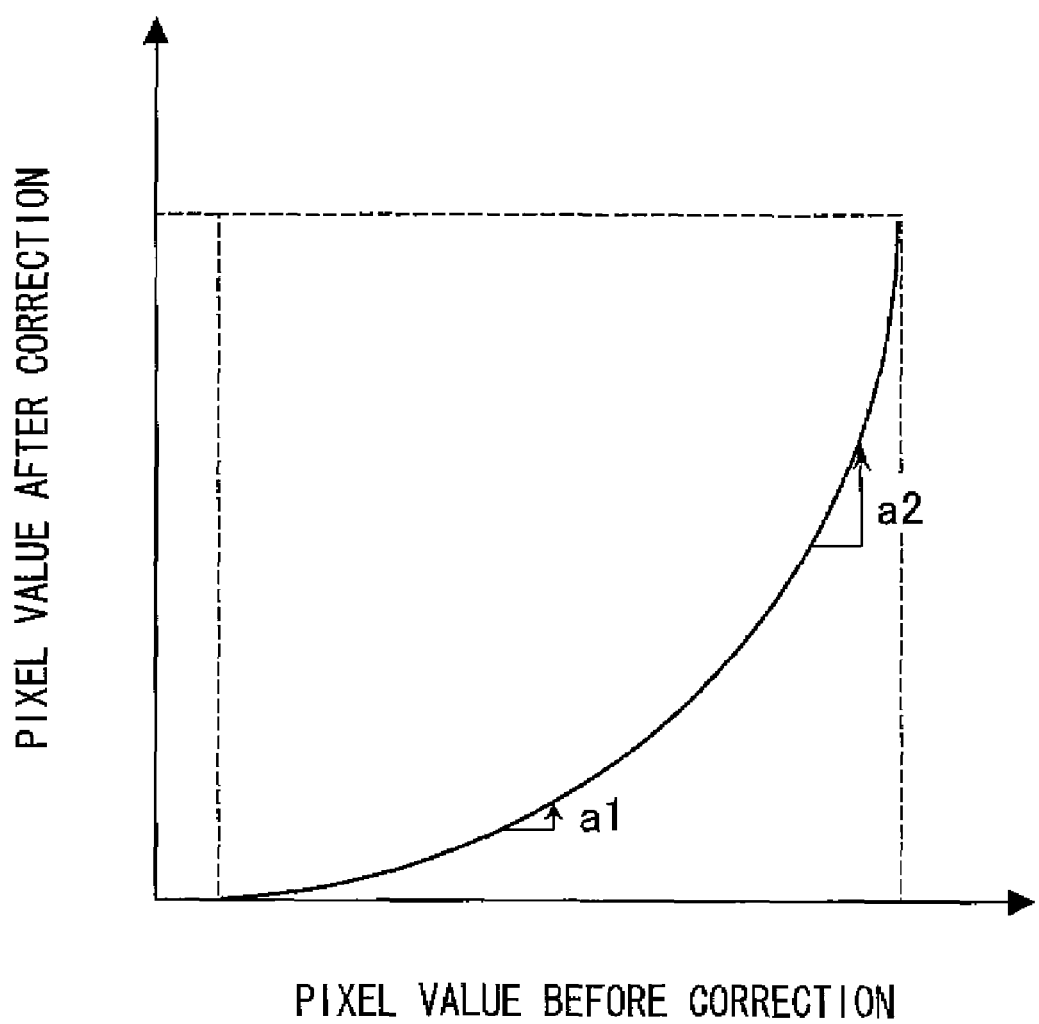
FIG. 11 is a figure showing an exemplary filter used in a pixel value correcting section of the defect detecting device shown in FIG. 1.

The pixel value correcting section 16 corrects the pixel values of the inspection-target image with the use of the filter shown in FIG. 11. In the filter in FIG. 11, the horizontal axis is a pixel value before this correction, and the vertical axis is a pixel value after the correction. It can be seen from FIG. 11 that application of the filter to the inspection-target image brings a result that the amount-of-change a2 in an area with high pixel values is greater than the amount-of-change a1 in an area with low pixel values. Accordingly, the filter causes a change in the pixel values after the correction in such a manner that the change in the areas is greater at higher pixel values in the inspection-target image. Thus, bright areas are relatively emphasized compared with dark areas in the inspection-target image corrected by the pixel value correcting section 16.

Figure 12:
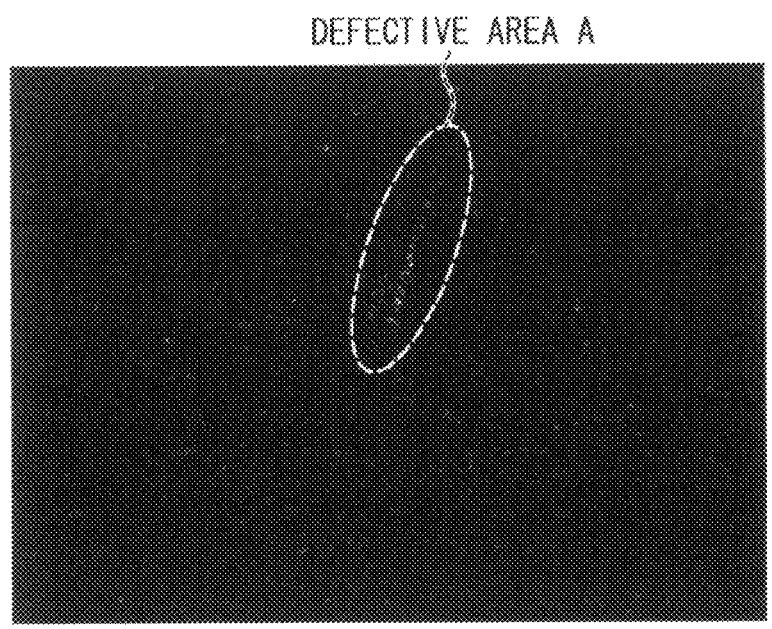
FIG. 12 is a figure showing an image resulting from the use of the filter shown in FIG. 11 in the pixel value correcting section of the defect detecting device shown in FIG. 1.
Figure 24:
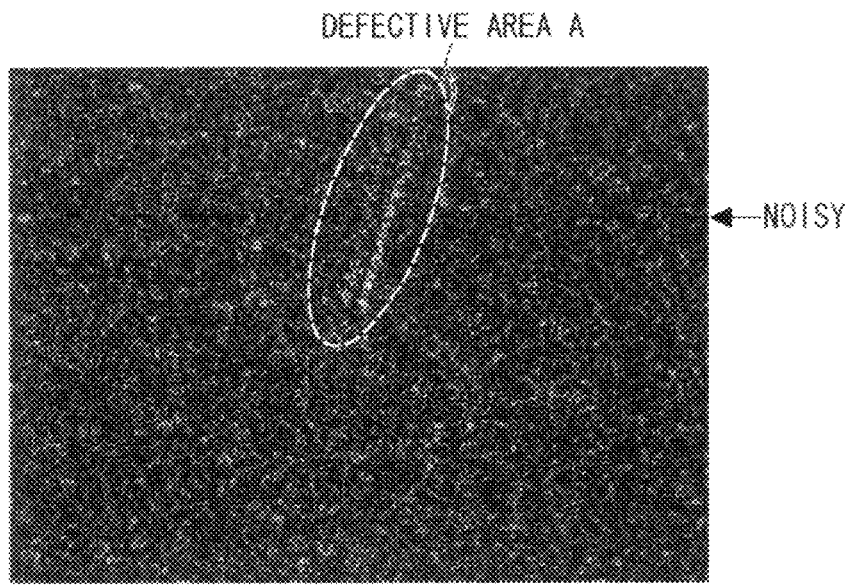
FIG. 24 is a figure showing an image as a result of edge detection carried out on the luminance image shown in FIG. 4 by the edge detecting section of the defect detecting device shown in FIG. 1.

Concretely, in the luminance-image and color-difference-image creating section 11, the luminance image shown in FIG. 4 is created on the basis of the original color image of the inspection-target image shown in FIG. 2. After the luminance image undergoes S2 to S4 (see FIG. 10), the edge detecting section 15 carries out the edge detection as shown in FIG. 24. The image having undergone the edge detection is passed through the filter in the pixel value correcting section 16, whereby the image shown in FIG. 12 is obtained.

Figure 13:
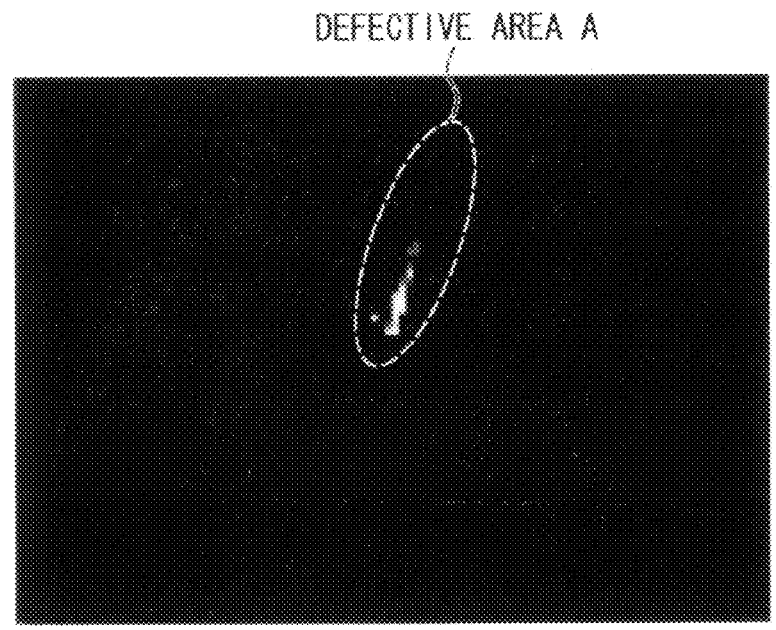
FIG. 13 is a figure showing an image as a result of the processing carried out on the image shown in FIG. 12 by a statistic processing section of the defect detecting device shown in FIG. 1.
Figure 25:
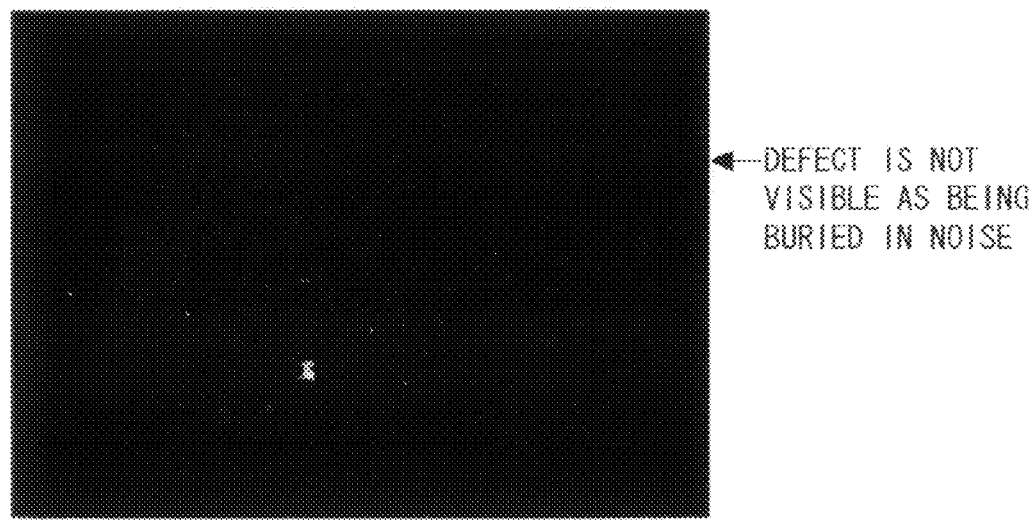
FIG. 25 is a figure showing an image of the case in which statistical processing is carried out on the image shown in FIG. 24 by use of a conventional defect detecting method.

In the conventional defect detecting devices, it is difficult to differentiate between the noise components and the defective area A, which is desired to be detected, after the edge detection as shown in FIG. 24. Thus, as shown in FIG. 25, the defective area A is buried in the noise components in the image having undergone the statistical processing. Thus, there is a possibility of overlooking the defective area A. The defect detecting device 1 of the present embodiment includes the pixel value correcting section 16 so that the defective area A, which is a bright area, is differentiated from the noise components and is more emphasized than the noise components are, as shown in FIG. 12. The image shown in FIG. 12 undergoes the processing in the block-division processing section 17 and the processing in the statistic processing section 18 so that the defective area A, which is desired to be detected, is reliably detected, as shown in FIG. 13.

As the foregoing describes, the defect detecting device 1 includes the pixel value correcting section 16 so that the defective areas and the noise components in the inspection-target image are reliably differentiated. This enables accurate detection of the defective areas. It also becomes possible to reduce erroneous determinations as to whether the defective area is present or not in the defect detecting device 1.

It should be noted that, although the pixel value correcting section 16 carries out the correction of the pixel values of the inspection-target image by use of the filter shown in FIG. 11, the correction is not limited to the foregoing correction. The pixel value may be corrected by use of the filters shown in FIGS. 14(*a*) to (*c*), for example.

Figure 14:
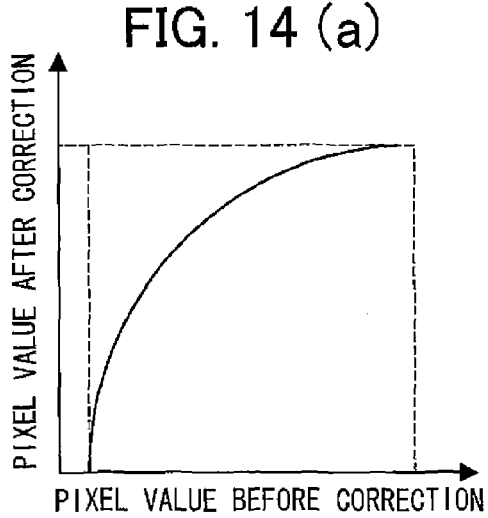
FIG. 14(a) is a figure showing another exemplary filter used in the pixel value correcting section of the defect detecting device shown in FIG. 1.
FIG. 14(b) is a figure showing another exemplary filter used in the pixel value correcting section of the defect detecting device shown in FIG. 1.
FIG. 14(c) is a figure showing another exemplary filter used in the pixel value correcting section of the defect detecting device shown in FIG. 1.
Figure 14:
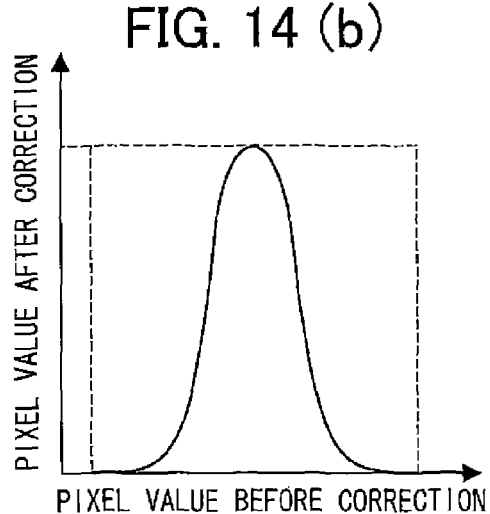
Figure 14:
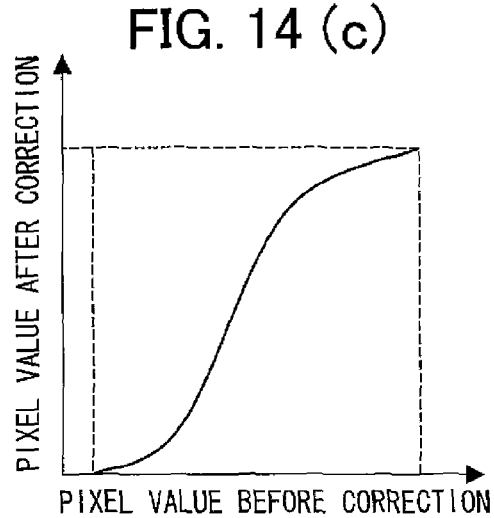

In FIGS. 14(*a*) to 14(*c*), the horizontal axis is the pixel value before the correction, and the vertical axis is the pixel value after the correction, in the same manner as FIG. 11. FIG. 14(*a*) is a filter that emphasizes the areas with low pixel values. Use of the filter in the pixel value correcting section 16 reduces the contrast of point-spot defect components having higher pixel values, and the point-spot defect components are equated by the block-division processing section 17. This makes it possible to fade the point-spot defect components. Thus, it becomes possible to detect a spot defect that has a large area and has a small difference from the surrounding pixels in luminance, without being affected by point defects or point-spot defects. Accordingly, the processing in the block-division processing section 17 and the processing in the statistic processing section 18 are carried out on the inspection-target image having undergone the processing in the pixel value correcting section 16, whereby the spot defects that have a large area and have a small difference from the surrounding pixels in luminance are reliably detectable. Note that the point-spot defect is a defect that is slightly larger than a point defect but is smaller than a common spot defect.

FIGS. 14(*b*) and 14(*c*) are filters each can emphasize an arbitrary position. Use of, especially, the filter shown in FIG. 14(*c*) allows improvement in contrast of a particular pixel value level so that it becomes possible to emphasize a defect having a higher value than the pixel value level. This enables more effective detection of the spot defects and the unevenness defects. FIG. 14(*b*) shows a filter by which it is possible to emphasize only a particular pixel value level. The filter can emphasize spot defects having many values close to the pixel value level.

5. Process Carried Out in the Block-Division Processing Section

The following describes the block division carries out in the block-division processing section 17. In the defect detecting device 1, the block-division processing section 17 determines the block shapes according to whether the defective area emphasized by the pixel value correcting section 16 is a spot defect, an unevenness defect, or a line defect. Then, the block-division processing section 17 carries out the division.

Figure 15:
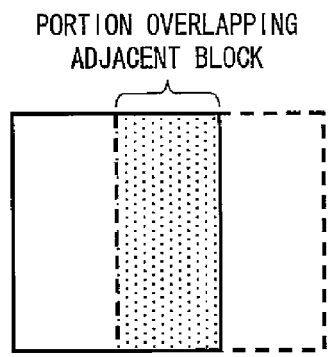
FIG. 15(a) is a figure showing exemplary block-division carried out in a block-division processing section of the defect detecting device shown in FIG. 1.
FIG. 15(b) is a figure showing another exemplary block-division carried out in the block-division processing section of the defect detecting device shown in FIG. 1.
FIG. 15(c) is a figure showing another exemplary block-division carried out in the block-division processing section of the defect detecting device shown in FIG. 1.
FIG. 15(d) is a figure showing another exemplary block-division carried out in the block-division processing section of the defect detecting device shown in FIG. 1.
Figure 15:
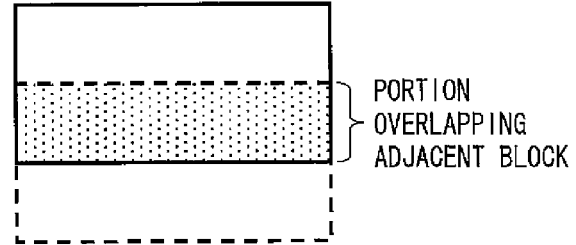
Figure 15:
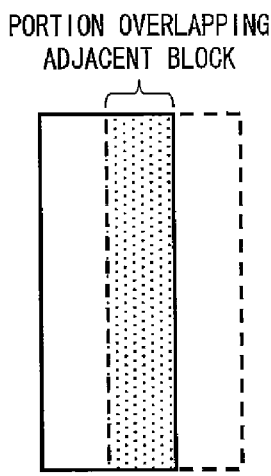
Figure 15:
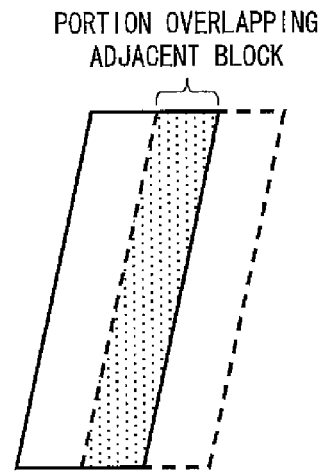

The block-division processing section 17 divides the inspection-target image into either a square encompassing the edges of the spot defects or a rectangular that is similar to a square and encompasses the edges of the spot defects, for example as shown in FIG. 15(*a*). Note that, for some sizes of one block, sequential division of the inspection-target image from the upper left sometimes results in the presence of a pixel, at an end of the inspection-target image, that is not encompassed in the block. In this case, the block division is carried out edgewise along the image. It is not always necessary to start the division of the blocks particularly from the upper left sequentially, as long as the division is carried out in such a manner that all pixels of the inspection-target image are encompassed. Further, the plural blocks having the shape as shown in FIG. 15(*a*) are used so that the edges of the spot defects are encompassed. This is the same in the block division that will be described later.

If the defective areas are line defects, especially if the line defects are vertical line defects, the block-division processing section 17 divides the image into vertically-long thin rectangles encompassing the edges of the line defects, for example as shown in FIG. 15(*b*). Especially if the image pickup device is a CCD sensor or a CMOS sensor, an image taken is likely to contain vertical line defects. It is thus effective with respect to the vertical line defects to divide the image into the vertically-long thin rectangles as shown in FIG. 15(*b*).

If the defective areas are horizontal line defects, the block-division processing section 17 divide the image into horizontally-long thin rectangles encompassing the edges of the line defects, for example as shown in FIG. 15(*c*). Especially a digital image shown on a flat panel display such as a liquid crystal panel or a plasma panel sometimes contains horizontal line defects. It is effective with respect to the horizontal line defects to divide the image into the horizontally-long thin rectangles as shown in FIG. 15(*c*).

If the defective areas are obliquely-run defects, the block-division processing section 17 divides the image into a parallelogram that encompasses the edges of the obliquely-run defects, for example as shown in FIG. 15(*d*). It should be noted that, although the division employs a parallelogram of, for example, 45° and −45° with respect to the horizontal direction of the inspection-target image (one of the inner angles is either 45° or 135°), it is also possible to employ a parallelogram having any other angles.

As the foregoing describes, the defect detecting device 1 includes the block-division processing section 17 so that the block shapes are determined according to the types of the defective areas that appear on the inspection-target image. This enables accurate detection specialized in the defective areas.

Note that, although the block-division processing section 17 determines the block shapes by use of the inspection-target image having the defective areas emphasized by the pixel value correcting section 16, it is also possible to use the inspection-target image having undergone the edge detection carried out in S5 of FIG. 10 by the edge detecting section 15.

In this case, the block-division processing section 17 determines the block shapes of FIGS. 15(*a*) to 15(*d*) in advance according to the spot defects, the line defects (vertical line defects or horizontal line defect), and the obliquely-run defects, and carries out the inspection, on the inspection-target image having undergone the edge detection, by use of the respective block shapes.

Concretely, the block-division processing section 17 first carries out the division into a square as shown in FIG. 15(*a*). Then, the block addition value or the block mean value is obtained. Thereafter, the process moves to the processing in the statistic processing section 18. Then, it is determined in the defective/non-defective determining section 19 whether or not the inspection-target image contains a spot defect. Thereafter, the division into the vertically-long rectangles as shown in FIG. 15(*b*) is carried out. Then, in the same manner, it is determined by the processing in the statistic processing section 18 and the processing in the defective/non-defective determining section 19 whether or not the inspection-target image contains a vertical line defect. Especially in the case in which a flat panel display such as a liquid crystal panel is used, the division into the horizontally-long rectangles is carried out in the block-division processing section 17 as shown in FIG. 15(*c*) to allow the statistic processing section 18 and the defective/non-defective determining section 19 to determine whether or not the inspection-target image contains a horizontal line defect. Once the division into parallelograms is carried out as shown in FIG. 15(*d*), it is determined by the processing in the statistic processing section 18 and the processing in the defective/non-defective determining section 19 whether or not the inspection-target image contains an obliquely-run defect. Note that the inspection using the respective block shapes may be carried out on the inspection-target image in any order. In the case in which the inspection using the respective block shapes is carried out on the inspection-target image, the parameters and the filter types for the processing in the point defect eliminating section 12, the processing in the noise eliminating section 13, the processing in the image compressing section 14, the processing in the edge detecting section 15, and the processing in the pixel value correcting section 16 are changeable according to the shapes of the respective blocks.

The following describes the processing in the block-division processing section 17 in the case in which the inspection-target image contains vertical line defects, with reference to FIGS. 16 to 19.

Figure 16:
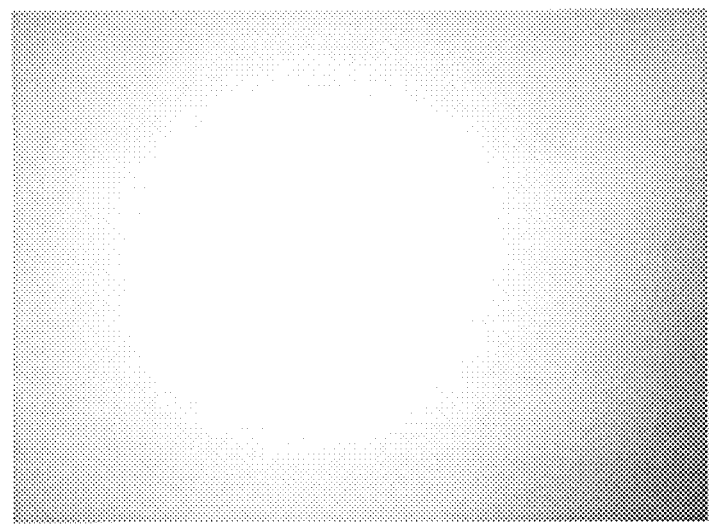
FIG. 16 is a figure showing a luminance image of the inspection-target image used in the defect detecting device shown in FIG. 1.
Figure 17:
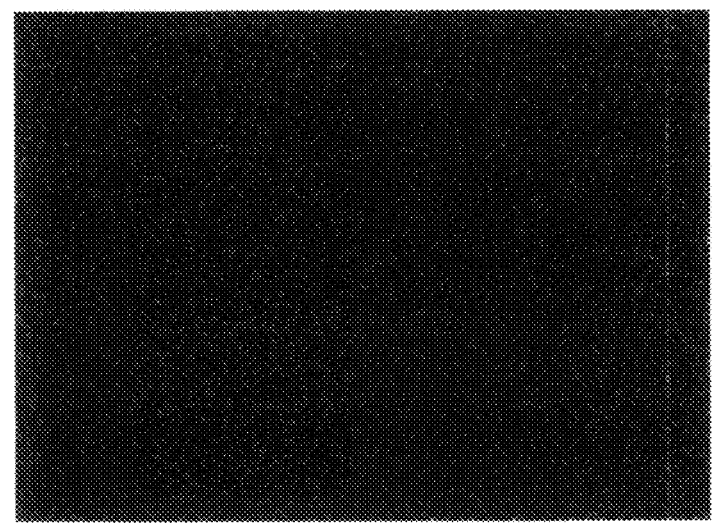
FIG. 17 is a figure showing an image as a result of edge detection carried out on the luminance image shown in FIG. 16 by an edge detecting section of the defect detecting device shown in FIG. 1.

FIG. 16 is a luminance image used as the inspection-target image. The luminance image is to contain a vertical line defect that should be detected. Carrying out S2 to S5 of FIG. 10 on the luminance image produces a luminance image having undergone the edge detection, as shown in FIG. 17. The processing in the block-division processing section 17 is carried out on the luminance image.

Figure 18:
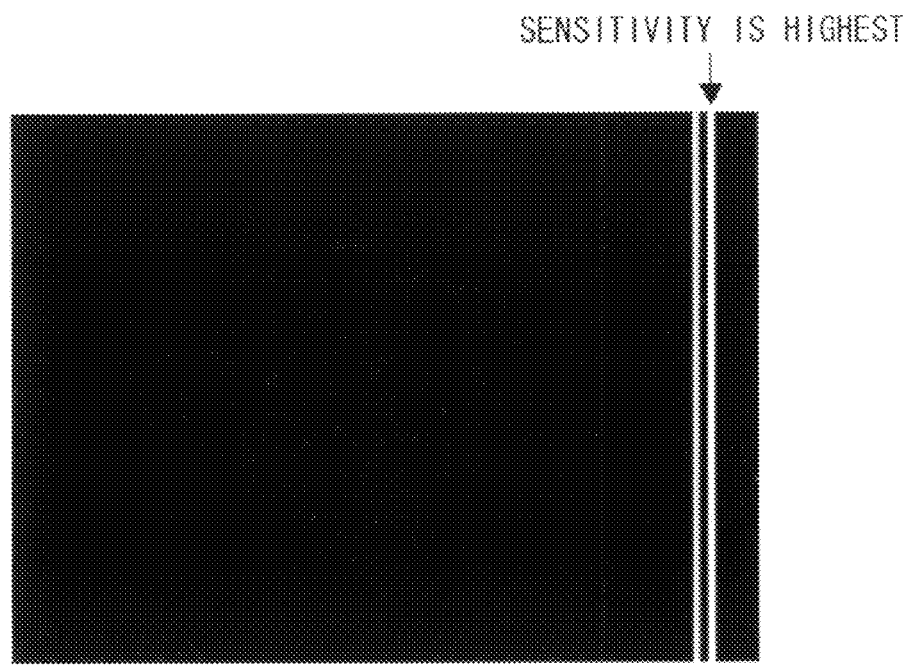
FIG. 18 is a figure showing an image as a result of the processing carried out on the image shown in FIG. 17 by the statistic processing section after the block-division processing section of the defect detecting device shown in FIG. 1 divides the image shown in FIG. 17 into vertically-long rectangular blocks.
Figure 19:
FIG. 19 is a figure showing an image as a result of the processing carried out on the image shown in FIG. 17 by the statistic processing section after the block-division processing section of the defect detecting device shown in FIG. 1 divides the image shown in FIG. 17 into square blocks.

FIG. 18 is an image that shows a result of the statistical processing carried out by the statistic processing section 18 after the block-division processing section 17 carries out the division into the vertically-long rectangles as shown in FIG. 15(*b*). FIG. 19 is an image that shows a result of the statistical processing carried out by the statistic processing section 18 after the block-division processing section 17 carries out the division into the squares as shown in FIG. 15(*a*).

As shown in FIG. 19, in the case in which the division into squares is carried out in the block-division processing section 17, the vertical line defect that should be detected is low in sensitivity. Thus, the vertical line defect that should be detected is less likely to be determined in the defective/non-defective determining section 19 as the defective area. On the other hand, in the case in which the division into rectangles is carried out in the block-division processing section 17 as shown in FIG. 18, the vertical line defect that should be detected has the highest sensitivity. Thus, the vertical line defect that should be detected is accurately detectable in the defective/non-defective determining section 19.

Accordingly, the defect detecting device 1 carries out the inspection on the inspection-target image by use of the block shapes shown in FIGS. 15(*a*) to 15(*d*), even if the inspection-target image having undergone the edge detection in the edge detecting section 15 is used, that is to say, even if the processing of the pixel value correcting section 16 is not carried out on the inspection-target image. In other words, the inspection is carried out by use of the block shapes that are prepared in advance in the block-division processing section 17 and correspond to the spot defects, the line defects, and the obliquely-run defects, respectively. This enables accurate detection specialized in the respective defective areas that appear on the inspection-target image.

6. Processing in the Case in which the Color-Difference Image is Used

The defect detecting device 1 of the present embodiment creates the luminance image or the color-difference image in the luminance-image and color-difference-image creating section 11. The following describes the case in which the vertical line defects are detected from the inspection-target image. Note that, in this detection of the vertical line defects, carrying out the processing in the pixel value correcting section 16 on the inspection-target image is not mandatory. Further, the block division into the vertically-long rectangles as shown in FIG. 15(*b*) is to be carried out in the block-division processing section 17.

Figure 20:
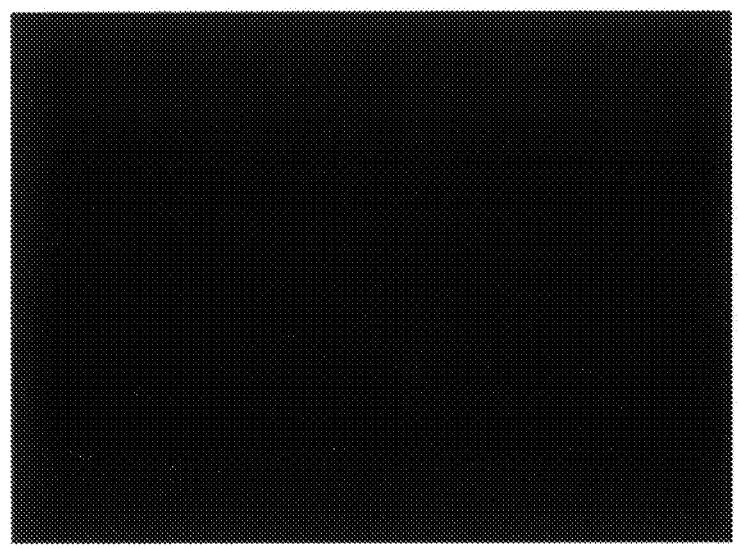
FIG. 20 is a figure showing an image as a result of edge detection carried out on the color-difference image shown in FIG. 6 by the edge detecting section of the defect detecting device shown in FIG. 1.
Figure 26:
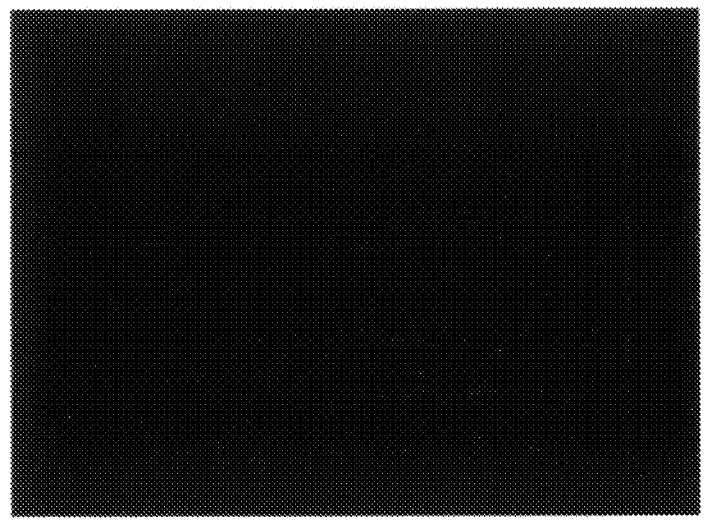
FIG. 26 is a figure showing an image as a result of edge detection carried out on the luminance image shown in FIG. 5 by the edge detecting section of the defect detecting device shown in FIG. 1.

First, the luminance-image and color-difference-image creating section 11 creates, on the basis of the original color image of the inspection-target image in FIG. 3, the luminance image shown in FIG. 5 and the color-difference image shown in FIG. 6. Further, S2 to S5 shown in FIG. 10 are carried out on each of the luminance image thus created and on the color-difference image thus created. FIG. 20 shows the color-difference image having undergone the edge detection carried out in S5 by the edge detecting section 15. FIG. 26 shows the luminance image having undergone the edge detection in the same manner as in FIG. 20.

Figure 21:
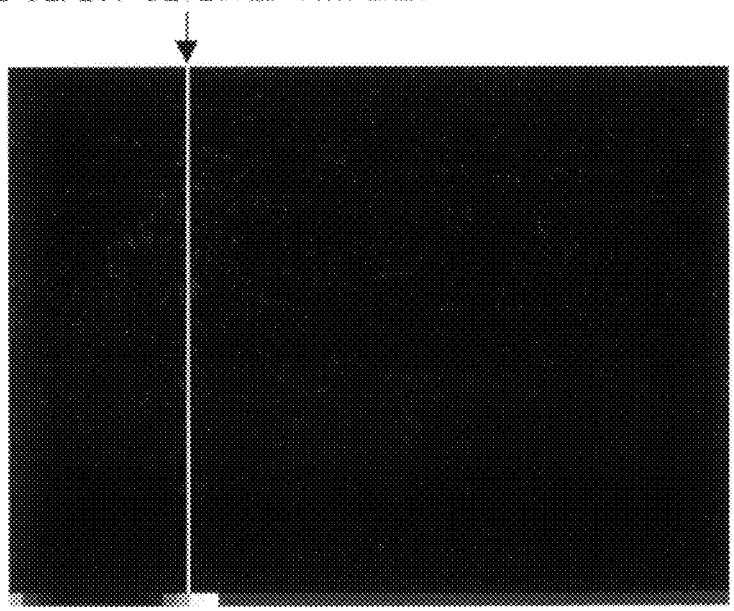
FIG. 21 is a figure showing an image as a result of the processing carried out on the image shown in FIG. 20 by the statistic processing section of the defect detecting device shown in FIG. 1.

The block-division processing section 17 divides each of the luminance image and the color-difference image into vertically-long rectangular blocks, and then obtains the block addition value or the block mean value. The images shown in FIGS. 21 and 27 are results of the statistical processing carried out by the statistic processing section 18 on the basis of the block addition value and the block mean value.

Figure 27:
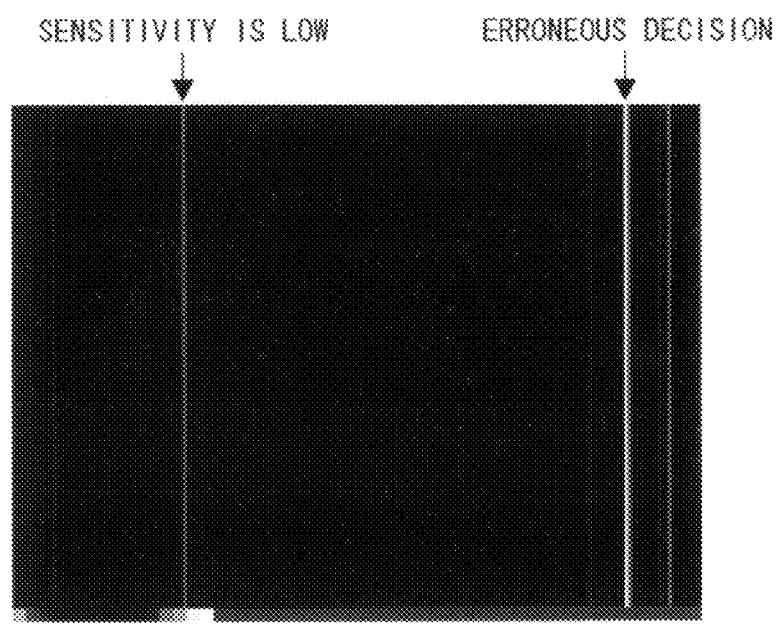
FIG. 27 is a figure showing an image of the case in which statistical processing is carried out on the image shown in FIG. 26 by use of a conventional defect detecting method.

In the case in which the inspection-target image is the luminance image, the defect that should be detected as the vertical line defect is not detected as the defective area, as shown in FIG. 27. In the case in which the inspection-target image is the color-difference image, the defect that should be detected as the vertical line defect is detected, as shown in FIG. 21.

Accordingly, the defect detecting device 1 includes the luminance-image and color-difference-image creating section 11 to create the color-difference image. This makes it possible to detect defects if the inspection-target image contains the defects due to color change. Especially if the defects due to color change are present in vertical lines, vertical line defects are detectable. The following discusses the reason therefore with reference to FIG. 22.

Figure 22:
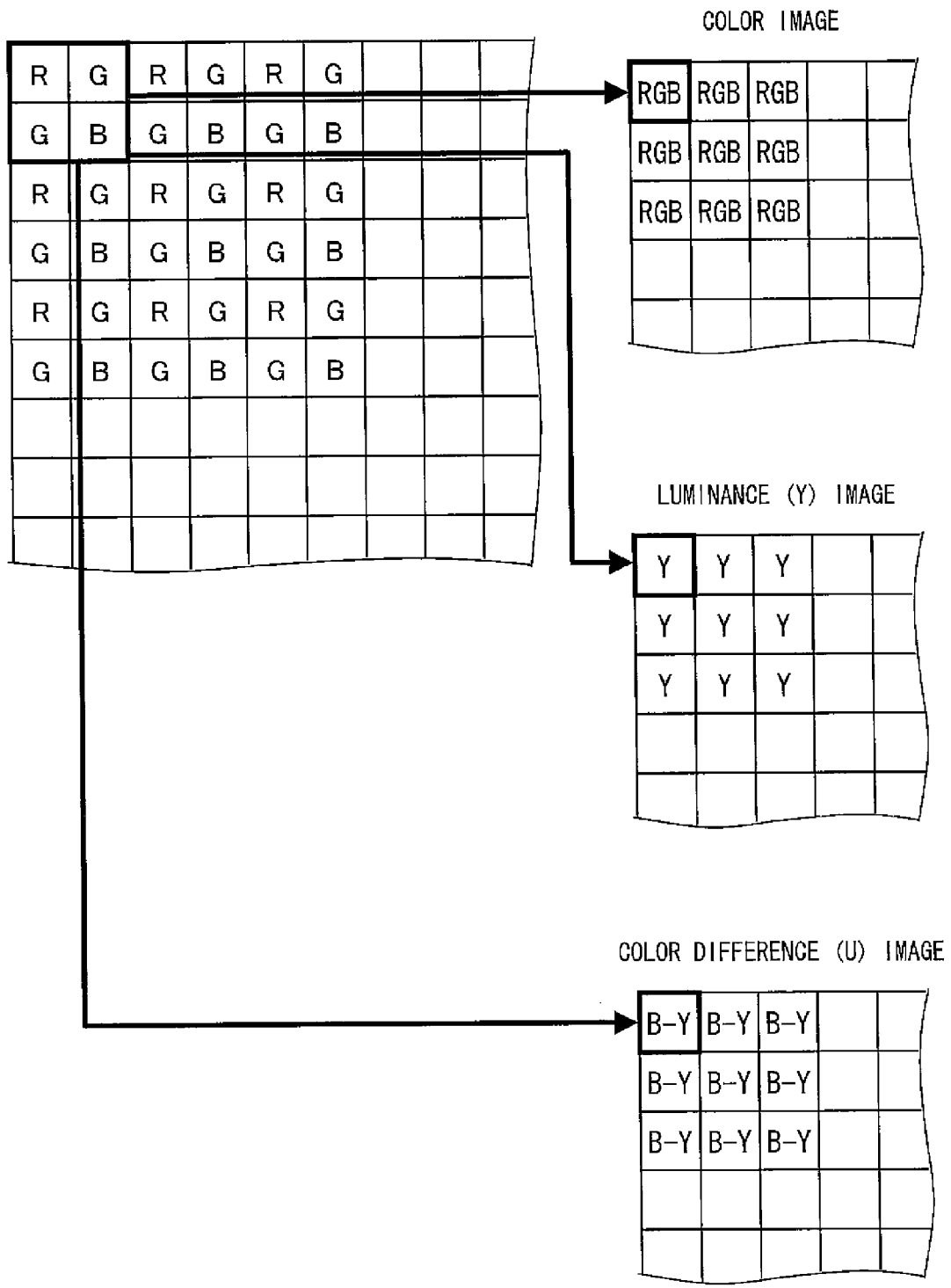
FIG. 22 is a figure showing an exemplary arrangement of a color filter of an image-sensor image, and a relationship between pixels of the image-sensor image and pixels of a color image, a luminance image, and a color-difference image.

FIG. 22 shows an exemplary arrangement of the color filter of the image-sensor image, and how the pixels of the image-sensor image relate to the pixels of the color image, the pixels of the luminance image, and the pixels of the color-difference image. The pixels of the image-sensor image are signals R, G, and B, as shown in FIG. 22. A set of four pixels of the image-sensor image corresponds to one pixel of the color image or one pixel of the luminance image. The color filter of the image-sensor image is arranged regularly in such a manner that a vertical line represented by RGRGRG . . . (i.e. group of RG) and a vertical line represented by GBGBGB . . . (i.e. group of GB) are repeated alternately.

When a vertical line defect occurs, the pixel values of the vertical line seem to be accompanied by color change in the color digital image, differing from the pixel values of the same-color filter line next but one to the vertical line on the left or right. Thus, use of the color-difference image, which is color information, enables accurate detection of the vertical line defect when the defects due to color change are present on the vertical line.

Note that, although the foregoing discusses the case in which the color-difference image is divided into the vertically-long rectangular blocks in the block-division processing section 17, this is not a limited case. For example the block-division processing section 17 may divide the image into the horizontally-long rectangular blocks as shown in FIG. 15(*c*). In this case, when a horizontal line defect occurs, the pixel values of the horizontal line seem to be accompanied by color change, in the same manner as in the case in which the vertical line defect occurs. Thus, if the defects due to color change are present on the horizontal line, the horizontal line defects are accurately detectable.

Further, although the color-difference image in FIG. 6 is an image produced by converting the inspection-target image into color-difference signals U, the image is not limited to the foregoing image. The same results are obtainable by use of an image converted into color-difference signals V.

Note that the vertical line defects contained in the luminance image shown in FIG. 5 are more difficult to detect than those contained in the luminance image shown in FIG. 16. In other words, the vertical line defects contained in the original color image of the inspection-target image shown in FIG. 3 are more difficult to detect than the vertical line defects contained in the original color image of the inspection-target image that forms the basis of the luminance image shown in FIG. 16.

As the foregoing describes, in the defect detecting device 1, the luminance-image and color-difference-image creating section 11 creates the color-difference image as shown in FIG. 6. Thus, even if the inspection-target image contains the vertical line defects that are difficult to detect even after the block-division processing section 17 divides the image into the vertically-long rectangular blocks, the defect detecting device 1 can accurately detect the vertical line defects by use of the color-difference image. It should be noted that the same effect is obtainable in the case in which the block-division processing section 17 carries out the block division into horizontally-long rectangles.

Accordingly, the defect detecting device 1 of the present embodiment includes the pixel value correcting section 16 so that the defective areas and the noise components on the inspection-target image are reliably differentiated. This enables accurate detection of the defective areas. It also becomes possible to reduce erroneous determinations as to whether the defective area is present or not.

Further, the defect detecting device 1 includes the block-division processing section 17 to determine the block shapes according to the types of the defective areas, such as the spot defects, the unevenness defects, and the line defect. This enables detection specialized in the respective defective areas. Furthermore, the block-division processing section 17 carries out the inspection by use of the block shapes that are prepared in advance and correspond to the spot defects, the line defects, and the obliquely-run defects, respectively. This enables accurate detection specialized in the defective areas even if the processing in the pixel value correcting section 16 is not carried out.

Further, the defect detecting device 1 includes the luminance-image and color-difference-image creating section 11 to create the color-difference image. This makes it possible to also detect the defects due to color change. Especially in the case in which the defects due to color change are present on a vertical line or on a horizontal line, it is possible to accurately detect the vertical line defects or the horizontal line defects.

7. Example

Figure 23:
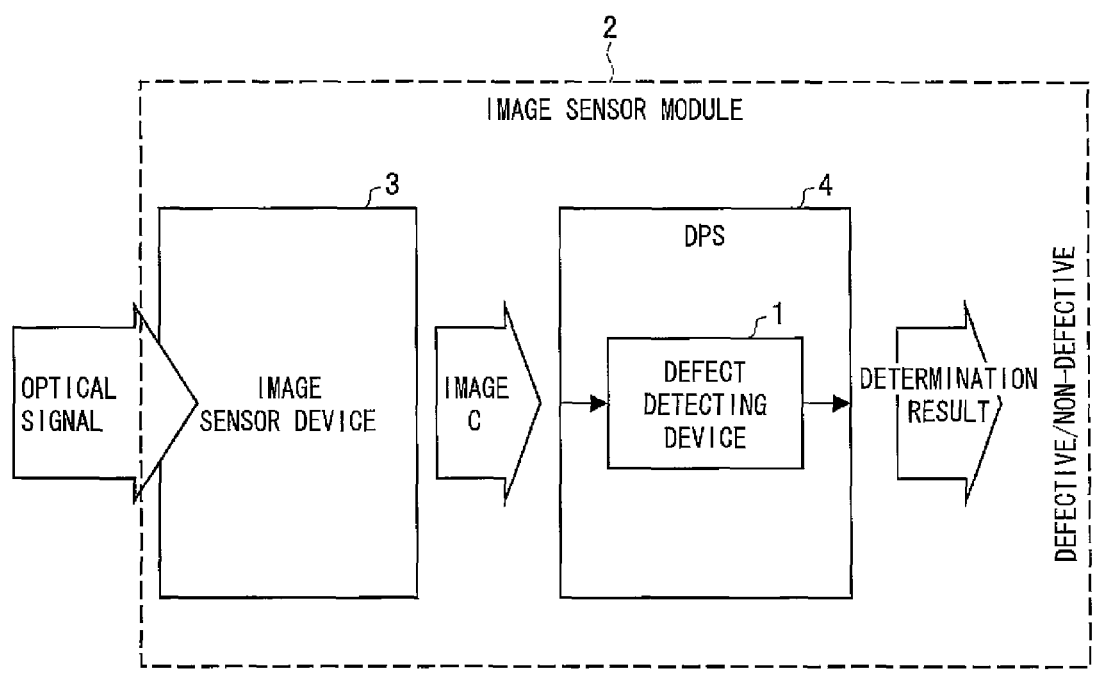
FIG. 23 is a block diagram showing a schematic configuration of an image sensor module in which the defect detecting device shown in FIG. 1 is built.

FIG. 23 is a block diagram showing a schematic configuration of the image sensor module 2 in which the defect detecting device 1 of the present embodiment is built. The image sensor module 2 includes an image sensor device 3 and a digital signal processor (hereinafter, DSP) 4. The DSP 4 includes the defect detecting device 1 of the present embodiment.

The image sensor device 3 imports optical signals with the use of built-in photodiodes for the respective pixels, and converts the optical signals into electric signals. Then, an image C, produced as a result of digitally converting the electric signals in such a way as to allow the electric signals to be processed in the following DSP 4, is supplied to the DSP 4.

The DSP 4 is a microprocessor specialized in digital signal processing, and realizes high-speed processing. The image C supplied to the DSP 4 is then supplied to the defect detecting device 1 provided inside of the DSP 4. The processing as described above (see FIG. 10) is carried out to determine whether the image C is defective or not. On the basis of the result of this determination carried out on the image C, for example a device defective/non-defective determining section (not illustrated) equipped to the defect detecting device 1 in the DSP 4 carries out defective/non-defective determination on the image sensor device 3 or the image sensor module 2. The results of the defective/non-defective determination carried out by the image sensor device 3 are supplied to, for example, a display section (not illustrated) of an inspecting device by which the image sensor module 2 is inspected.

As the foregoing describes, the image sensor module 2 includes the defect detecting device 1. This makes it possible to accurately determine as to whether an image imported by the image sensor device 3 is defective or not. Thus, it is also possible to accurately inspect defectiveness and non-defectiveness in the image sensor device 3.

Note that, although the defect detecting device 1 is provided in the DSP 4 in the image sensor module 2 shown in FIG. 23, it is only necessary that the defect detecting device 1 is provided in the image sensor module 2. For example the defect detecting device 1 may be provided in the image sensor device 3. Further, the defect detecting device 1 may be installed in an external device instead of the inside of the image sensor module 2. For example, the defect detecting device 1 may be installed either in an image processing device (not illustrated) including an RGB separating section, a CPU (central processing unit) section, plural memories and the like, or in a tester device (not illustrated) by which quality of a digital image is inspected. In this case, it is not necessary to provide every function of the defect detecting device 1 to the external device. For example, the middle to the end part of the block processing as shown in FIG. 1, such as the statistic processing section 18 and the defective/non-defective determining section 19, may be provided to the external device. Further, in the defect detecting device 1 of the present embodiment, the processing in the pixel value correcting section 16 is carried out after the edge detecting section 15 manifests the edges of the spot defects, the unevenness defects, the line defect and the like. This, however, is not a limited case, and it is also possible to carry out the processing in the edge detecting section 15 following the processing in the pixel value correcting section 16.

8. Addendum Information

With a defect detecting method executed by the defect detecting device of the present embodiment, it is also possible to record as a program in a computer-readable recording medium recording programs that are to be executed on a computer. This makes it possible to provide, in a portable manner, a recording medium storing a program for executing the defect detecting method of the present embodiment.

Since the processing is executed by a micro computer, the recording medium may be a memory, which is not illustrated, such as a program media, i.e. ROM (read only memory). A program reading device, which is not illustrated, may be provided as an external storage device, and the recording medium may be a program medium that becomes readable when being inserted in the program reading device.

In any cases, programs that are stored may be accessed by a microprocessor to be executed, or the program may be read out and downloaded to a program storage area, which is not illustrated, of a micro-computer to be executed. In this case, programs for downloading are to be stored in advance in a main device.

The program media are recording media removable from main units, and may be media holding programs permanently, including: tapes such as magnetic tapes and cassette tapes; disks such as magnetic disks (e.g., floppy (registered trademark) disk, hard disk) and optical disks (e.g., CD-ROM, MO, MD, DVD, CD-R); cards such as IC cards (including memory card) and optical cards; and semiconductor memories such as mask ROM, EPROM (Erasable Programmable Read Only Memory), EEPROM (Electrically Erasable Programmable Read Only Memory), and flash ROM.

In this case, the system is configured so as to be connectable to a communication network including the Internet. Thus, the medium may keep programs in a temporary manner by downloading the programs from the communication network. If the programs are to be downloaded from the communication network, it is acceptable that a program for the downloading is either stored in advance in a receiver or installed from a different recording medium.

The present invention is not limited to the description of the embodiments above, but may be altered by a skilled person within the scope of the claims. An embodiment based on a proper combination of technical means disclosed in different embodiments is encompassed in the technical scope of the present invention.

As the foregoing describes, a defect detecting device of the present invention that detects, from a digital image, a defective area where a pixel value changes more unevenly than a pixel value in an area surrounding the defective area does, includes: a pixel value correcting section that corrects a pixel value of an inspection-target image, on which detection of the defective area is to be carried out, in such a manner that a pixel value corresponding to an area that is to be detected as the defective area is emphasized with respect to a pixel value of an area other than the defective area; and a block-division processing section that divides the inspection-target image into plural blocks and obtains a block addition value, which is a value obtained by adding pixel values of pixels present in a block, or a block mean value, which is a value obtained by dividing the block addition value by the number of pixels in the block. The block addition value or the block mean value is supplied to a defective-area presence determining section that determines whether the defective area is present or not, by carrying out statistical processing to determine whether an outlier of the block addition value or an outlier of the block mean value is present or not.

With this configuration, if a defective area is present in the inspection-target image, the pixel value correcting section corrects the pixel value of the defective area so as to emphasize the pixel value. In the block-division processing section, the inspection-target image is divided into plural blocks, and the block addition value or the block mean value is obtained. In other words, the inspection-target image undergoes the processing in the pixel value correcting section and the processing in the block-division processing section in the defect detecting device. The block addition value or the block mean value thus obtained in the block-division processing section is supplied to the defective-area presence determining section. Then, statistical processing based on the block addition value or the block mean value is carried out in the defective-area presence determining section to determine whether the defective area is present or not in the inspection-target image.

The foregoing reliably differentiates between the defective areas and the noise components in the inspection-target image. This enables accurate detection of defective areas. Furthermore, it also becomes possible to reduce erroneous determination as to whether a defective area is present or not.

Note that the timing at when the block-division processing section carries out computation of the block addition value or the block mean value, both of which are to be supplied to the defective-area presence determining section, may be either before or after the processing in the pixel value correcting section. That is to say, the block-division processing section may obtain the block addition value or the block mean value of respective blocks of the inspection-target image either before or after the pixel value correcting section corrects the pixel value of the inspection-target image.

Further, it is preferable that the block-division processing section divides the inspection-target image having undergone correction of the pixel value, which correction is carried out in the pixel value correcting section. Further, it is preferable that the pixel value correcting section correct a pixel value of a block thus formed as a result of division carried out in the block-division processing section, and that the block-division processing section obtain the block addition value or the block mean value of each block having undergone correction of the pixel value, which correction is carried out in the pixel value correcting section. Further, it is preferable that the pixel value correcting section correct the pixel value of the inspection-target image on which the block-division processing section has carried out processing to divide the inspection-target image into plural blocks and to obtain the block addition value or the block mean value of the inspection-target image.

With this configuration, the inspection-target image undergoes the processes carried out by the pixel value correcting section and the block-division processing section. The foregoing reliably differentiates between the defective areas and the noise components in the inspection-target image. This enables accurate detection of the defective areas. It also becomes possible to reduce erroneous determination as to whether the defective area is present or not.

Further, it is preferable that the pixel value correcting section be realized by applying, to the inspection-target image, a filter that causes a change in a pixel value of an area of the inspection-target image in such a manner that the higher the pixel value of the area is, the greater the change becomes.

With this configuration, the pixel value correcting section corrects the pixel values in such a way as to emphasize the pixel values of the defective areas by use of the filter that causes a change in a pixel value of an area of the inspection-target image in such a manner that the higher the pixel value of the area is, the greater the change becomes. The foregoing reliably differentiates between the defective areas and the noise components in the inspection-target image. This enables accurate detection of the defective areas.

A defect detecting device of the present invention that detects, from a digital image, a defective area where a pixel value changes more unevenly than a pixel value of an area surrounding the defective area does, includes: a block-division processing section that divides an inspection-target image, on which detection of the defective area is to be carried out, in a block shape predetermined according to a shape of the defective area, and obtains a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With this configuration, the block-division processing section divides the image in a block shape predetermined according to the shape of the defective area, and obtains the block addition value or the block mean value of each block. The block addition value or the block mean value is supplied to the defective-area presence determining section, and the statistical processing based on the block addition value or the block mean value is carried out in the defective-area presence determining section to determine whether a defective area is present or not in the inspection-target image.

The foregoing enables the block-division processing section to inspect the defective areas by use of the block shapes corresponding to the defective areas, respectively. This enables accurate detection specialized in the respective defective areas. Further, the defective-area presence determining section carries out the processing by use of the block addition value or the block mean value of the inspection-target image thus processed in the block-division processing section. This makes it possible to reduce erroneous determinations as to whether a defective area is present or not.

Further, it is preferable that the block shape be vertically-long rectangular. For example if the inspection-target image is taken by an image pickup device such as CCD sensors or CMOS sensors, vertical line defects passing through the inspection-target image in the vertical direction easily occur. However, with the foregoing configuration, the block shape employed in the block-division processing section contains vertically-long rectangles so that it is possible to reliably detect the vertical line defects.

Further, it is preferable that the block shape be horizontally-long rectangular. For example if the inspection-target image is a digital image shown on a flat panel display such as liquid crystal panels or plasma panels, there is a possibility that horizontal line defects passing through the inspection-target image in the horizontal direction occur. However, with the foregoing configuration, the block shape employed in the block-division processing section contains horizontally-long rectangles so that it is possible to reliably detect the horizontal line defects.

A defect detecting device of the present invention that detects, from a digital image, a defective area where a pixel value changes more unevenly than a pixel value of an area surrounding the defective area does, includes: an image creating section that creates a color-difference image based on an inspection-target image, on which detection of the defective area is to be carried out; and a block-division processing section that divides the color-difference image, which is created in the image creating section, into plural blocks, and obtains a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With this configuration, the color-difference image is created in the image creating section as the inspection-target image. In the block-division processing section, the color-difference image is divided into the plural blocks, and obtains the block addition value or the block mean value of each block. Then, the block addition value or the block mean value is supplied to the defective-area presence determining section, and the statistical processing based on the block addition value or on the block mean value is carried out in the defective-area presence determining section, whereby it is determined whether the defective area is present or not in the inspection-target image.

The foregoing makes it possible to detect the defects due to color change in the inspection-target image. Further, if the defects due to color change are present in either the vertical direction or the horizontal direction of the inspection-target image, the vertical line defects or the horizontal line defects are accurately detectable. Further, the processing in the defective-area presence determining section is carried out by use of the block addition value or the block mean value of the color-difference image having undergone the processing in the block-division processing section. This makes it possible to reduce erroneous determinations as to whether the defective area is present or not.

Further, it is preferable that the block-division processing section divide the inspection-target image into plural blocks in such a manner that adjacent blocks overlap each other.

When the inspection-target image is divided into the plural blocks without making adjacent blocks overlap, the defective areas sometimes appear in such a way as to spread across adjacent blocks. In this case, the defective areas are dispersed in the block addition values or the block mean values of two different blocks and then give influence. Thus, it is sometimes impossible to appropriately determine whether the defective areas are present or not.

With the foregoing configuration, the block-division processing section divides the inspection-target image into the plural blocks in such a way as to overlap adjacent blocks. This makes it possible to reliably accommodate the defective areas within one block. Thus, it becomes possible to prevent the block addition values or the block mean values of two blocks, which are affected by the defective areas in a different manner, from being affected. This makes it possible to detect the defective area with high sensitivity.

Further, it is preferable to include: a point defect eliminating section that eliminates, from the inspection-target image, a point defect having a pixel value outstanding from a pixel value around the point defect; a noise eliminating section that eliminates, by use of a filter, a noise component from the inspection-target image from which the point defect has been eliminated in the point defect eliminating section; and an image compressing section that compresses the inspection-target image from which the noise component has been eliminated in the noise eliminating section.

With this configuration, the point defects of the inspection-target image are eliminated in the point defect eliminating section, and the noise components of the inspection-target image are eliminated in the noise eliminating section. Accordingly, the point defects, which are not a target of detection, are eliminated from the inspection-target image before the processing in the noise eliminating section. This makes it possible to prevent the point defects from being detected as the defective areas such as the spot defects that are the target of detection. Further, the inspection-target image is compressed in the image compressing section. This makes it possible to reduce the amount of data of the inspection-target image and to eliminate the noise components that the noise eliminating section fails to eliminate.

Note that the defect detecting device having the foregoing configuration may be provided to an image sensor device or an image sensor module.

A defect detecting method, according to the present invention, of detecting, from a digital image, a defective area where a pixel value changes more unevenly than a pixel value of an area surrounding the defective area does, includes: correcting a pixel value of an inspection-target image, on which detection of the defective area is to be carried out, in such a manner that a pixel value corresponding to an area that is to be detected as the defective area is emphasized with respect to a pixel value of an area other than the defective area; and dividing the inspection-target image into plural blocks and obtaining a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With the foregoing defect detecting methods, the same processes as those carried out in the defect detecting device of the present invention are realized in the respective steps. Thus, the same effects as those produced by the defect detecting device of the present invention are obtainable.

A defect detecting method, according to the present invention, of detecting, from a digital image, a defective area where a pixel value changes more unevenly than a pixel value of an area surrounding the defective area does, includes: dividing an inspection-target image, on which detection of the defective area is to be carried out, in a block shape predetermined according to a shape of the defective area, and obtaining a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With the foregoing defect detecting methods, the same processes as those carried out in the defect detecting device of the present invention are realized in the respective steps. Thus, the same effects as those produced by the defect detecting device of the present invention are obtainable.

A defect detecting method, according to the present invention, of detecting, from a digital image, a defective area where a pixel value changes more unevenly than a pixel value of an area surrounding the defective area does, includes: creating a color-difference image based on an inspection-target image, on which detection of the defective area is to be carried out; and dividing the color-difference image, which is created in the step of creating a color-difference image, into plural blocks and obtaining a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

With the foregoing defect detecting methods, the same processes as those carried out in the defect detecting device of the present invention are realized in the respective steps. Thus, the same effects as those produced by the defect detecting device of the present invention are obtainable.

Further, with a defect detecting program that causes a computer to execute the defect detecting method, the same effects as those produced by the defect detecting method of the present invention can be obtained by use of a computer. Further, storing the defect detecting program into a computer-readable recording medium makes it possible to execute the defect detecting program on any computer.

As the foregoing describes, the defect detecting device of the present invention includes a pixel value correcting section and a block-division processing section. The pixel value correcting section corrects a pixel value of an inspection-target image, on which detection of the defective area is to be carried out, in such a manner that a pixel value corresponding to an area that is to be detected as the defective area is emphasized with respect to a pixel value of an area other than the defective area. The block-division processing section divides the inspection-target image into plural blocks and obtains a block addition value, which is a value obtained by adding pixel values of pixels present in a block, or a block mean value, which is a value obtained by dividing the block addition value by the number of pixels present in the block. The block addition value or the block mean value is supplied to a defective-area presence determining section that determines whether the defective area is present or not, by carrying out statistical processing to determine whether an outlier of the block addition value or an outlier of the block mean value is present or not.

The foregoing reliably differentiates between the defective areas and the noise components in the inspection-target image. This enables accurate detection of the defective areas. It also becomes possible to reduce erroneous determination as to whether the defective area is present or not.

Further, as the foregoing describes, the defect detecting device of the present invention includes a block-division processing section. The block-division processing section divides the inspection-target image, on which detection of the defective area is to be carried out, in a block shape predetermined according to the shape of the defective area. The block-division processing section obtains the block addition value or the block mean value. The block addition value is a value obtained by adding pixel values of pixels present in a block. The block man value is a value obtained by dividing the block addition value by the number of pixels present in the block. The block addition value or the block mean value is supplied to the defective-area presence determining section that determines whether the defective area is present, by carrying out statistical processing to determine whether an outlier of the block addition value or an outlier of the block mean value is present or not.

The foregoing allows the block-division processing section to inspect the respective defective areas by use of the block shapes corresponding to the defective areas, respectively. This enables accurate detection specialized in the respective defective areas. Further, the processing in the defective-area presence determining section is carried out on the inspection-target image having undergone the processing in the block-division processing section. This makes it possible to reduce erroneous determinations as to whether the defective area is present or not.

Further, as the foregoing describes, the defect detecting device of the present invention includes an image creating section and a block-division processing section. The image creating section creates a color-difference image based on an inspection-target image, on which detection of the defective area is to be carried out. The block-division processing section divides the color-difference image, which is created in the image creating section, into plural blocks, and obtains the block addition value or the block mean value. The block addition value is a value obtained by adding pixel values of pixels present in a block. The block mean value is a value obtained by dividing the block addition value by the number of pixels present in the block. The block addition value or the block mean value is supplied to the defective-area presence determining section that determines whether the defective area is present or not, by carrying out statistical processing to determine whether an outlier of the block addition value or an outlier of the block mean value is present or not.

The foregoing makes it possible to detect the defects due to color change in the inspection-target image. Further, if the defects due to color change are present in either the vertical direction or the horizontal direction of the inspection-target image, the vertical line defects or the horizontal line defects are accurately detectable. Further, the processing in the defective-area presence determining section is carried out by use of the block addition value or the block mean value of the color-difference image having undergone the processing in the block-division processing section. This makes it possible to reduce erroneous determinations as to whether the defective area is present or not.

With the defect detecting device of the present invention, it is possible to accurately determine whether the defects are present or not in an image sensor device. The defect detecting device of the present invention is suitable especially for quality inspection of image sensor devices that are demanded to be high in quality. The defect detecting device is also applicable to inspection of digital images shown on flat panel displays (e.g. liquid crystal panels, plasma panels).

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A defect detecting device that detects, from a digital image, a defective area where a pixel value changes more unevenly than a pixel value in an area surrounding the defective area does, the defect detecting device comprising:
   an edge detection section that carries out manifestation of an edge of a defect in a pixel value of an inspection-target image,
   a pixel value correcting section that corrects the pixel value where an edge is detected, on which detection of the defective area is to be carried out, in such a manner that a pixel value corresponding to an area that is to be detected as the defective area is emphasized with respect to a pixel value of an area other than the defective area; and
   a block-division processing section that divides the inspection-target image into plural blocks and obtains a block addition value, which is a value obtained by adding pixel values of pixels present in a block, or a block mean value, which is a value obtained by dividing the block addition value by the number of pixels in the block,
   the block addition value or the block mean value being supplied to a defective-area presence determining section that determines whether the defective area is present or not, by carrying out statistical processing to determine whether an outlier of the block addition value or an outlier of the block mean value is present or not,
   wherein the pixel value correcting section corrects the pixel value of the inspection-target image on which the block-division processing section has carried out processing to divide the inspection-target image into plural blocks and to obtain the block addition value or the block mean value of the inspection-target image.

2. The device of claim 1, wherein
the block-division processing section divides the inspection-target image having undergone correction of the pixel value, which correction is carried out in the pixel value correcting section.

3. The device of claim 1, wherein the pixel value correcting section is realized by applying, to the inspection-target image, a filter that causes a change in a pixel value of an area of the inspection-target image in such a manner that the higher the pixel value of the area is, the greater the change becomes.

4. A defect detecting device that detects, from a digital image, a defective area where a pixel value changes more unevenly than a pixel value of an area surrounding the defective area does, the defect detecting device comprising:
   a block-division processing section that divides an inspection-target image, on which detection of the defective area is to be carried out, in a predetermined block shape corresponding to a shape of the defective area, and obtains a block addition value, which is a value obtained by adding pixel values of pixels present in a block, or a block mean value, which is a value obtained by dividing the block addition value by the number of pixels present in the block,
   the block addition value or the block mean value being supplied to a defective-area presence determining section that determines whether the defective area is present or not, by carrying out statistical processing to determine whether an outlier of the block addition value or an outlier of the block mean value is present or not, wherein
   the predetermined block shape includes a parallelogram having an oblique angle with respect to a horizontal direction of the inspection-target image.

5. The device of claim 1, wherein the plural blocks have a block shape that is vertically-long rectangular.

6. The device of claim 1, wherein the plural blocks have a block shape that is horizontally-long rectangular.

7. A defect detecting device that detects, from a digital image, a defective area where a pixel value changes more unevenly than a pixel value of an area surrounding the defective area does, the defect detecting device comprising:
   an image creating section that creates a color-difference image based on an inspection-target image, on which detection of the defective area is to be carried out;
   a point defect eliminating section that eliminates, from the inspection-target image, a point defect having a pixel value outstanding from a pixel value around the point defect;
   a noise eliminating section that eliminates, by use of a filter, a noise component from the inspection-target image from which the point defect has been eliminated in the point defect eliminating section;
   an image compressing section that compresses the inspection-target image from which the noise component has been eliminated in the noise eliminating section; and
   a block-division processing section that divides the color-difference image, which is created in the image creating section, into plural blocks, and obtains a block addition value, which is a value obtained by adding pixel values of pixels present in a block, or a block mean value, which is a value obtained by dividing the block addition value by the number of pixels present in the block, the block addition value or the block mean value being supplied to a defective-area presence determining section that determines whether the defective area is present or not, by carrying out statistical processing to determine whether an outlier of the block addition value or an outlier of the block mean value is present or not.

8. The device of claim 1, wherein the block-division processing section divides the inspection-target image into plural blocks in such a manner that adjacent blocks overlap each other.

9. The device of claim 1, further comprising:
a point defect eliminating section that eliminates, from the inspection-target image, a point defect having a pixel value outstanding from a pixel value around the point defect;
a noise eliminating section that eliminates, by use of a filter, a noise component from the inspection-target image from which the point defect has been eliminated in the point defect eliminating section; and
an image compressing section that compresses the inspection-target image from which the noise component has been eliminated in the noise eliminating section.

10. An image sensor device, comprising a defect detecting device defined in claim 1.

11. An image sensor device, comprising a defect detecting device defined in claim 4.

12. An image sensor device, comprising a defect detecting device defined in claim 7.

13. An image sensor module, comprising a defect detecting device defined in claim 1.

14. An image sensor module, comprising a defect detecting device defined in claim 4.

15. An image sensor module, comprising a defect detecting device defined in claim 7.

16. A defect detecting method of detecting, from a digital image, a defective area where a pixel value changes more unevenly than a pixel value of an area surrounding the defective area does, the method comprising:
detecting an edge by carrying out manifestation of an edge of a defect in a pixel value of an inspection-target image,
correcting the pixel value where an edge is detected, on which detection of the defective area is to be carried out, in such a manner that a pixel value corresponding to an area that is to be detected as the defective area is emphasized with respect to a pixel value of an area other than the defective area; and
dividing the inspection-target image into plural blocks and obtaining a block addition value, which is a value obtained by adding pixel values of pixels present in a block, or a block mean value, which is a value obtained by dividing the block addition value by the number of pixels present in the block, the block addition value or the block mean value being supplied to a defective-area presence determining section that determines whether the defective area is present or not, by carrying out statistical processing to determine whether an outlier of the block addition value or an outlier of the block mean value is present or not, wherein correcting the pixel value comprises correcting the pixel value of the inspection-target image on which the block-division processing section has carried out processing to divide the inspection-target image into plural blocks and to obtain the block addition value or the block mean value of the inspection-target image.

17. A defect detecting method of detecting, from a digital image, a defective area where a pixel value changes more unevenly than a pixel value of an area surrounding the defective area does, the method comprising:
creating a color-difference image based on an inspection-target image, on which detection of the defective area is to be carried out;
eliminating, from the inspection-target image, a point defect having a pixel value outstanding from a pixel value around the point defect;
eliminating, by use of a filter, a noise component from the inspection-target image from which the point defect has been eliminated in the point defect eliminating section; and
compressing the inspection-target image from which the noise component has been eliminated in the noise eliminating step; and
dividing the color-difference image, which is created in the step of creating a color-difference image, into plural blocks and obtaining a block addition value, which is a value obtained by adding pixel values of pixels present in a block, or a block mean value, which is a value obtained by dividing the block addition value by the number of pixels present in the block,
the block addition value or the block mean value being supplied to a defective-area presence determining section that determines whether the defective area is present or not, by carrying out statistical processing to determine whether an outlier of the block addition value or an outlier of the block mean value is present or not.

18. A non-transitory computer-readable recording medium, storing a defect detecting program for causing a computer to execute the method defined in claim 16.

19. A non-transitory computer-readable recording medium, storing a defect detecting program for causing a computer to execute the method defined in claim 17.

* * * * *